(12) United States Patent
Derrick et al.

(10) Patent No.: US 7,804,412 B2
(45) Date of Patent: *Sep. 28, 2010

(54) REMOTE TRACKING AND COMMUNICATION DEVICE

(75) Inventors: Bruce Derrick, Sandy, UT (US); David S. McNab, Calgary (CA); Stephen N. D. Larson, Calgary (CA); Gerard E. Robidoux, Calgary (CA); B. Kent Davidson, Calgary (CA); Patrick Y. D. Boutet, Quebec (CA); Jean-Sebastien Langlois, Charlesbourg (CA); David J. Kalhok, Marion, IL (US); Scott S. Walker, Calgary (CA)

(73) Assignee: SecureAlert, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/028,088

(22) Filed: Feb. 8, 2008

(65) Prior Publication Data

US 2008/0218358 A1    Sep. 11, 2008

Related U.S. Application Data

(63) Continuation of application No. 11/202,427, filed on Aug. 10, 2005, now Pat. No. 7,330,122.

(51) Int. Cl.
*G08B 23/00* (2006.01)
(52) U.S. Cl. ............... 340/573.1; 340/539.13; 340/573.4; 340/692; 340/693.2; 379/38; 455/404.2
(58) Field of Classification Search ............. 340/573.1, 340/573.4, 539.11–539.13, 693.1, 693.2, 340/692, 693.5; 455/404.1, 404.2; 379/37–39, 379/41, 45
See application file for complete search history.

(56) References Cited

U.S. PATENT DOCUMENTS 2,986,543 A    5/1961 Daniel (Continued)

FOREIGN PATENT DOCUMENTS

DE    4413974    11/1995

(Continued)

OTHER PUBLICATIONS

International Search Report and Written Opinion issued for PCT Application PCT/US2007/072736; Dated: Jan. 28, 2008; 11 Pages.

(Continued)

*Primary Examiner*—Thomas J Mullen
(74) *Attorney, Agent, or Firm*—Workman Nydegger

(57) ABSTRACT

A remote tracking and communication device comprising a housing which encloses a processor, a memory, a position locator, a first transmitter, and a second transmitter. Each of the latter components are electronically coupled to the processor. Both the first and second transmitters are adapted to send and receive wireless voice and data signals in a digital format. The device further comprises a first battery, which is removably affixed to the housing and electronically coupled to each component within the housing, a speaker and a microphone electronically coupled to the first transmitter, and a button electronically coupled to the processor. When pressed, the button is adapted to activate voice communications with a call center using the first transmitter.

35 Claims, 12 Drawing Sheets

U.S. PATENT DOCUMENTS

| | | |
|---|---|---|
| 3,210,747 A | 10/1965 | Clynes |
| 3,440,633 A | 4/1969 | Vinding |
| 3,462,692 A | 8/1969 | Bartlett |
| 3,478,344 A | 11/1969 | Schwitzgebel |
| 3,568,161 A | 3/1971 | Knickel |
| 3,572,316 A | 3/1971 | Vogelman |
| 3,609,741 A | 9/1971 | Miller |
| 3,639,907 A | 2/1972 | Greatbach |
| 3,656,456 A | 4/1972 | Stigmark |
| 3,665,448 A | 5/1972 | McGlinchey |
| 3,743,865 A | 7/1973 | Reichmann |
| 3,758,855 A | 9/1973 | Meyer |
| 3,764,819 A | 10/1973 | Muller |
| 3,876,890 A | 4/1975 | Brown |
| 3,882,277 A | 5/1975 | DePedro |
| 3,898,472 A | 8/1975 | Long |
| 3,898,984 A | 8/1975 | Mandel |
| 3,914,692 A | 10/1975 | Seaborn |
| 3,925,763 A | 12/1975 | Wadhwani |
| 3,930,249 A | 12/1975 | Steck |
| 3,972,320 A | 8/1976 | Kalman |
| 3,973,208 A | 8/1976 | Diamond |
| 3,983,483 A | 9/1976 | Pando |
| 4,095,214 A | 6/1978 | Minasy |
| 4,110,741 A | 8/1978 | Hubert |
| 4,157,540 A | 6/1979 | Oros |
| 4,234,840 A | 11/1980 | Konrad |
| 4,237,344 A | 12/1980 | Moore |
| 4,258,709 A | 3/1981 | Flack |
| 4,259,665 A | 3/1981 | Manning |
| 4,275,385 A | 6/1981 | White |
| 4,285,146 A | 8/1981 | Charles |
| 4,293,852 A | 10/1981 | Rogers |
| 4,295,132 A | 10/1981 | Burney |
| 4,309,697 A | 1/1982 | Weaver |
| 4,316,134 A | 2/1982 | Balan |
| 4,319,241 A | 3/1982 | Mount |
| 4,331,161 A | 5/1982 | Patel |
| 4,342,986 A | 8/1982 | Buskirk |
| 4,359,733 A | 11/1982 | O'Neill |
| 4,445,118 A | 4/1984 | Taylor |
| 4,446,454 A | 5/1984 | Pyle |
| 4,523,184 A | 6/1985 | Abel |
| 4,536,755 A | 8/1985 | Holzgang |
| 4,549,169 A | 10/1985 | Moura |
| 4,558,309 A | 12/1985 | Antonevich |
| 4,559,526 A | 12/1985 | Tani |
| 4,578,539 A | 3/1986 | Townsing |
| 4,591,661 A | 5/1986 | Benedetto |
| 4,596,988 A | 6/1986 | Wanka |
| 4,598,272 A | 7/1986 | Cox |
| 4,598,275 A | 7/1986 | Ross |
| 4,622,544 A | 11/1986 | Bially |
| 4,630,035 A | 12/1986 | Stahl |
| 4,651,157 A | 3/1987 | Gray |
| 4,665,370 A | 5/1987 | Holland |
| 4,665,385 A | 5/1987 | Henderson |
| 4,665,387 A | 5/1987 | Cooper |
| 4,667,203 A | 5/1987 | Counselman |
| 4,673,936 A | 6/1987 | Kotoh |
| 4,675,656 A | 6/1987 | Narcisse |
| 4,682,155 A | 7/1987 | Shirley |
| 4,701,760 A | 10/1987 | Raoux |
| 4,728,959 A | 3/1988 | Maloney |
| 4,731,613 A | 3/1988 | Endo |
| 4,736,196 A | 4/1988 | McMahon |
| 4,737,976 A | 4/1988 | Borth |
| 4,740,792 A | 4/1988 | Sagey |
| 4,741,245 A | 5/1988 | Malone |
| 4,742,336 A | 5/1988 | Hall |
| 4,742,357 A | 5/1988 | Rackley |
| 4,747,120 A | 5/1988 | Foley |
| 4,750,197 A | 6/1988 | Denekamp |
| 4,751,512 A | 6/1988 | Longaker |
| 4,754,283 A | 6/1988 | Fowler |
| 4,754,465 A | 6/1988 | Trimble |
| 4,764,757 A | 8/1988 | DeMarco |
| 4,777,477 A | 10/1988 | Watson |
| 4,791,572 A | 12/1988 | Green |
| 4,809,005 A | 2/1989 | Counselman |
| 4,812,823 A | 3/1989 | Dickerson |
| 4,812,991 A | 3/1989 | Hatch |
| 4,819,053 A | 4/1989 | Halavais |
| 4,819,162 A | 4/1989 | Webb |
| 4,819,860 A | 4/1989 | Hargrove |
| 4,820,966 A | 4/1989 | Fridman |
| 4,825,457 A | 4/1989 | Lebowitz |
| 4,833,477 A | 5/1989 | Tendler |
| 4,837,568 A | 6/1989 | Snaper |
| 4,843,377 A | 6/1989 | Fuller |
| 4,864,277 A | 9/1989 | Goodman |
| 4,885,571 A | 12/1989 | Pauley |
| 4,888,716 A | 12/1989 | Ueno |
| 4,891,650 A | 1/1990 | Sheffer |
| 4,891,761 A | 1/1990 | Gray |
| 4,894,662 A | 1/1990 | Counselman |
| 4,897,642 A | 1/1990 | Dilullo |
| 4,903,212 A | 2/1990 | Yokouchi |
| 4,907,290 A | 3/1990 | Crompton |
| 4,908,629 A | 3/1990 | Apsell et al. |
| 4,912,756 A | 3/1990 | Hop |
| 4,916,435 A | 4/1990 | Fuller |
| 4,918,425 A | 4/1990 | Greenberg |
| 4,918,432 A | 4/1990 | Pauley |
| 4,924,699 A | 5/1990 | Kuroda |
| 4,928,107 A | 5/1990 | Kuroda |
| 4,952,913 A | 8/1990 | Pauley |
| 4,952,928 A | 8/1990 | Carroll |
| 4,953,198 A | 8/1990 | Daly |
| 4,956,861 A | 9/1990 | Kondo |
| 4,961,212 A | 10/1990 | Marui |
| 4,965,548 A | 10/1990 | Fayfield |
| 4,980,671 A | 12/1990 | McCurdy |
| 4,983,980 A | 1/1991 | Ando |
| 4,993,061 A | 2/1991 | Hsieh |
| 4,996,161 A | 2/1991 | Conners |
| 4,999,613 A | 3/1991 | Williamson |
| 5,003,317 A | 3/1991 | Gray |
| 5,003,595 A | 3/1991 | Collins |
| 5,008,930 A | 4/1991 | Gawrys |
| 5,014,040 A | 5/1991 | Weaver |
| 5,014,066 A | 5/1991 | Counselman |
| 5,014,206 A | 5/1991 | Scribner |
| 5,019,802 A | 5/1991 | Brittain |
| 5,019,828 A | 5/1991 | Schoolman |
| 5,021,794 A | 6/1991 | Lawrence |
| 5,023,904 A | 6/1991 | Kaplan |
| 5,025,253 A | 6/1991 | Dilullo |
| 5,025,261 A | 6/1991 | Ohta |
| 5,032,823 A | 7/1991 | Bower |
| 5,032,845 A | 7/1991 | Velasco |
| 5,043,736 A | 8/1991 | Darnell |
| 5,055,851 A | 10/1991 | Sheffer |
| 5,075,670 A | 12/1991 | Bower |
| 5,077,788 A | 12/1991 | Cook |
| 5,081,667 A | 1/1992 | Drori |
| 5,115,223 A | 5/1992 | Moody |
| 5,117,222 A | 5/1992 | McCurdy |
| 5,119,102 A | 6/1992 | Barnard |
| 5,131,020 A | 7/1992 | Liebesny |
| 5,146,207 A | 9/1992 | Henry |
| 5,148,231 A | 9/1992 | Ghaem |
| 5,148,471 A | 9/1992 | Metroka |
| 5,148,473 A | 9/1992 | Freeland et al. |

| Patent No. | Date | Name |
|---|---|---|
| 5,155,689 A | 10/1992 | Wortham |
| 5,170,426 A | 12/1992 | D'Alessio et al. |
| 5,179,519 A | 1/1993 | Adachi |
| 5,182,543 A | 1/1993 | Siegel |
| 5,193,215 A | 3/1993 | Olmer |
| 5,198,831 A | 3/1993 | Burrell |
| 5,203,009 A | 4/1993 | Bogusz |
| 5,204,670 A | 4/1993 | Stinton |
| 5,206,897 A | 4/1993 | Goudreau |
| 5,218,344 A | 6/1993 | Ricketts |
| 5,218,367 A | 6/1993 | Sheffer |
| 5,220,509 A | 6/1993 | Takemura |
| 5,223,844 A | 6/1993 | Mansell |
| 5,225,842 A | 7/1993 | Brown |
| 5,235,320 A | 8/1993 | Romano |
| 5,235,633 A | 8/1993 | Dennison |
| 5,243,652 A | 9/1993 | Teare |
| 5,247,564 A | 9/1993 | Zicker |
| 5,255,183 A | 10/1993 | Katz |
| 5,255,306 A | 10/1993 | Melton |
| 5,257,195 A | 10/1993 | Hirata |
| 5,266,944 A | 11/1993 | Carroll |
| 5,266,958 A | 11/1993 | Durboraw |
| 5,268,845 A | 12/1993 | Startup |
| 5,274,695 A | 12/1993 | Green |
| 5,278,539 A | 1/1994 | Lauterbach |
| 5,297,186 A | 3/1994 | Dong |
| 5,298,884 A | 3/1994 | Gilmore |
| 5,299,132 A | 3/1994 | Wortham |
| 5,305,370 A | 4/1994 | Kearns |
| 5,307,277 A | 4/1994 | Hirano |
| 5,311,197 A | 5/1994 | Sorden |
| 5,311,374 A | 5/1994 | Oh |
| 5,317,309 A | 5/1994 | Vercellotti |
| 5,317,620 A | 5/1994 | Smith |
| 5,319,374 A | 6/1994 | Desai |
| 5,319,698 A | 6/1994 | Glidewell |
| 5,334,974 A | 8/1994 | Simms |
| 5,334,986 A | 8/1994 | Fernhout |
| 5,349,530 A | 9/1994 | Odagawa |
| 5,353,376 A | 10/1994 | Oh |
| 5,355,140 A | 10/1994 | Slavin |
| 5,357,560 A | 10/1994 | Nykerk |
| 5,365,451 A | 11/1994 | Wang |
| 5,365,570 A | 11/1994 | Boubelik |
| 5,367,524 A | 11/1994 | Rideout |
| 5,369,699 A | 11/1994 | Page |
| 5,374,933 A | 12/1994 | Kao |
| 5,377,256 A | 12/1994 | Franklin |
| 5,379,224 A | 1/1995 | Brown |
| 5,388,147 A | 2/1995 | Grimes |
| 5,389,934 A | 2/1995 | Kass |
| 5,392,052 A | 2/1995 | Eberwine |
| 5,394,333 A | 2/1995 | Kao |
| 5,396,227 A | 3/1995 | Carroll |
| 5,396,516 A | 3/1995 | Padovani |
| 5,396,540 A | 3/1995 | Gooch |
| 5,398,190 A | 3/1995 | Wortham |
| 5,402,466 A | 3/1995 | Delahanty |
| 5,416,468 A | 5/1995 | Baumann |
| 5,416,695 A | 5/1995 | Stutman |
| 5,416,808 A | 5/1995 | Witsaman |
| 5,418,537 A | 5/1995 | Bird |
| 5,422,816 A | 6/1995 | Sprague |
| 5,426,425 A | 6/1995 | Conrad |
| 5,428,546 A | 6/1995 | Shah |
| 5,430,656 A | 7/1995 | Dekel |
| 5,437,278 A | 8/1995 | Wilk |
| 5,438,315 A | 8/1995 | Nix |
| 5,444,430 A | 8/1995 | Mcshane |
| 5,448,221 A | 9/1995 | Weller |
| 5,451,948 A | 9/1995 | Jekel |
| 5,461,365 A | 10/1995 | Schlager |
| 5,461,390 A | 10/1995 | Hoshen |
| 5,465,388 A | 11/1995 | Zicker |
| 5,475,751 A | 12/1995 | McMonagle |
| 5,479,149 A | 12/1995 | Pike |
| 5,479,479 A | 12/1995 | Braitberg |
| 5,479,482 A | 12/1995 | Grimes |
| 5,485,385 A | 1/1996 | Mitsugi |
| 5,490,200 A | 2/1996 | Snyder |
| 5,493,692 A | 2/1996 | Theimer |
| 5,493,694 A | 2/1996 | Vicek et al. |
| 5,497,148 A | 3/1996 | Olivia |
| 5,497,149 A | 3/1996 | Fast |
| 5,504,482 A | 4/1996 | Schreder |
| 5,510,797 A | 4/1996 | Abraham |
| 5,512,879 A | 4/1996 | Stokes |
| 5,513,111 A | 4/1996 | Wortham |
| 5,515,043 A | 5/1996 | Bernard |
| 5,515,062 A | 5/1996 | Maine |
| 5,515,285 A | 5/1996 | Garrett |
| 5,517,419 A | 5/1996 | Lanckton |
| 5,518,402 A | 5/1996 | Tommarello |
| 5,519,380 A | 5/1996 | Edwards |
| 5,519,403 A | 5/1996 | Bickley |
| 5,519,621 A | 5/1996 | Wortham |
| 5,523,740 A | 6/1996 | Burgmann |
| 5,525,967 A | 6/1996 | Azizi |
| 5,525,969 A | 6/1996 | LaDue |
| 5,528,248 A | 6/1996 | Steiner |
| 5,532,690 A | 7/1996 | Hertel |
| 5,537,102 A | 7/1996 | Pinnow |
| 5,541,845 A | 7/1996 | Klein |
| 5,542,100 A | 7/1996 | Hatakeyama |
| 5,543,780 A | 8/1996 | Mcauley et al. |
| 5,544,661 A | 8/1996 | Davis |
| 5,546,445 A | 8/1996 | Dennison |
| 5,550,551 A | 8/1996 | Alesio |
| 5,552,772 A | 9/1996 | Janky |
| 5,555,286 A | 9/1996 | Tendler |
| 5,557,254 A | 9/1996 | Johnson |
| 5,559,491 A | 9/1996 | Stadler |
| 5,559,497 A | 9/1996 | Hong |
| 5,563,931 A | 10/1996 | Bishop |
| 5,568,119 A | 10/1996 | Schnipper |
| 5,572,204 A | 11/1996 | Timm |
| 5,572,217 A | 11/1996 | Flawn |
| 5,574,649 A | 11/1996 | Levy |
| 5,576,716 A | 11/1996 | Sadler |
| 5,587,715 A | 12/1996 | Lewis |
| 5,588,038 A | 12/1996 | Snyder |
| 5,589,834 A | 12/1996 | Weinberg |
| 5,594,425 A | 1/1997 | Ladner |
| 5,594,650 A | 1/1997 | Shah |
| 5,596,262 A | 1/1997 | Boll |
| 5,596,313 A | 1/1997 | Berglund |
| 5,598,151 A | 1/1997 | Torii |
| 5,600,230 A | 2/1997 | Dunstan |
| 5,602,739 A | 2/1997 | Haagenstad |
| 5,612,675 A | 3/1997 | Jennings |
| 5,617,317 A | 4/1997 | Ignagni |
| 5,621,388 A | 4/1997 | Sherburne |
| 5,625,668 A | 4/1997 | Loomis |
| 5,627,520 A | 5/1997 | Grubbs |
| 5,627,548 A | 5/1997 | Woo |
| 5,629,693 A | 5/1997 | Janky |
| 5,630,206 A | 5/1997 | Urban |
| 5,644,317 A | 7/1997 | Weston |
| 5,646,593 A | 7/1997 | Hughes |
| 5,650,770 A | 7/1997 | Schlager |
| 5,652,570 A | 7/1997 | Lepkofker |
| 5,673,035 A | 9/1997 | Huang |
| 5,673,305 A | 9/1997 | Ross |
| 5,677,521 A | 10/1997 | Garrou |
| 5,682,133 A | 10/1997 | Johnson |

| Patent No. | Kind | Date | Name |
|---|---|---|---|
| 5,682,142 | A | 10/1997 | Loosmore |
| 5,684,828 | A | 11/1997 | Bolan et al. |
| 5,686,910 | A | 11/1997 | Timm |
| 5,686,924 | A | 11/1997 | Trimble |
| 5,687,215 | A | 11/1997 | Timm |
| 5,694,452 | A | 12/1997 | Bertolet |
| 5,699,256 | A | 12/1997 | Shibuya |
| 5,703,598 | A | 12/1997 | Emmons |
| 5,705,980 | A | 1/1998 | Shapiro |
| 5,712,619 | A | 1/1998 | Simkin |
| 5,715,277 | A | 2/1998 | Goodson |
| 5,721,678 | A | 2/1998 | Widl |
| 5,722,081 | A | 2/1998 | Tamura |
| 5,722,418 | A | 3/1998 | Bro |
| 5,724,316 | A | 3/1998 | Brunts |
| 5,726,893 | A | 3/1998 | Schuchman |
| 5,727,057 | A | 3/1998 | Emery |
| 5,731,757 | A | 3/1998 | Layson, Jr. |
| 5,732,076 | A | 3/1998 | Ketseoglou |
| 5,736,962 | A | 4/1998 | Tendler |
| 5,740,049 | A | 4/1998 | Kaise |
| 5,740,532 | A | 4/1998 | Fernandez |
| 5,740,547 | A | 4/1998 | Kull |
| 5,742,233 | A | 4/1998 | Hoffman |
| 5,742,509 | A | 4/1998 | Goldberg |
| 5,742,666 | A | 4/1998 | Alpert |
| 5,742,686 | A | 4/1998 | Finley |
| 5,742,904 | A | 4/1998 | Pinder |
| 5,745,037 | A | 4/1998 | Guthrie |
| 5,745,849 | A | 4/1998 | Britton |
| 5,745,868 | A | 4/1998 | Geier |
| 5,748,089 | A | 5/1998 | Sizemore |
| 5,748,148 | A | 5/1998 | Heiser |
| 5,751,246 | A | 5/1998 | Hertel |
| 5,752,976 | A | 5/1998 | Duffin |
| 5,757,367 | A | 5/1998 | Kapoor |
| 5,760,692 | A | 6/1998 | Block |
| 5,767,788 | A | 6/1998 | Ness |
| 5,771,002 | A | 6/1998 | Creek |
| 5,774,825 | A | 6/1998 | Reynolds |
| 5,777,580 | A | 7/1998 | Janky |
| 5,781,101 | A | 7/1998 | Stephen |
| 5,784,029 | A | 7/1998 | Geier |
| 5,786,789 | A | 7/1998 | Janky |
| 5,790,022 | A | 8/1998 | Delvecchio |
| 5,790,974 | A | 8/1998 | Tognazzini |
| 5,793,283 | A | 8/1998 | Davis |
| 5,793,630 | A | 8/1998 | Theimer |
| 5,794,174 | A | 8/1998 | Janky |
| 5,796,613 | A | 8/1998 | Kato |
| 5,796,777 | A | 8/1998 | Terlep |
| 5,797,091 | A | 8/1998 | Clise |
| 5,805,055 | A | 9/1998 | Colizza |
| 5,809,426 | A | 9/1998 | Radojevic |
| 5,809,520 | A | 9/1998 | Edwards |
| 5,811,886 | A | 9/1998 | Majmudar |
| 5,815,118 | A | 9/1998 | Schipper |
| 5,818,333 | A | 10/1998 | Yaffe |
| 5,819,864 | A | 10/1998 | Koike |
| 5,825,283 | A | 10/1998 | Camhi |
| 5,825,327 | A | 10/1998 | Krasner |
| 5,825,871 | A | 10/1998 | Mark |
| 5,828,292 | A | 10/1998 | Kokhan |
| 5,831,535 | A | 11/1998 | Reisman |
| 5,835,017 | A | 11/1998 | Ohkura |
| 5,835,907 | A | 11/1998 | Newman |
| 5,842,146 | A | 11/1998 | Shishido |
| 5,844,894 | A | 12/1998 | Bent |
| 5,847,679 | A | 12/1998 | Yee |
| 5,852,401 | A | 12/1998 | Kita |
| 5,857,433 | A | 1/1999 | Files |
| 5,867,103 | A | 2/1999 | Taylor, Jr. |
| 5,868,100 | A | 2/1999 | Marsh |
| 5,873,040 | A | 2/1999 | Dunn |
| 5,874,801 | A | 2/1999 | Kobayashi |
| 5,874,889 | A | 2/1999 | Higdon |
| 5,875,402 | A | 2/1999 | Yamawaki |
| 5,877,724 | A | 3/1999 | Davis |
| 5,889,474 | A | 3/1999 | LaDue |
| 5,890,061 | A | 3/1999 | Timm |
| 5,890,092 | A | 3/1999 | Kato |
| 5,892,447 | A | 4/1999 | Wilkinson |
| 5,892,454 | A | 4/1999 | Schipper |
| 5,892,825 | A | 4/1999 | Mages |
| 5,894,498 | A | 4/1999 | Kotzin |
| 5,898,391 | A | 4/1999 | Jefferies |
| 5,900,734 | A | 5/1999 | Munson |
| 5,905,461 | A | 5/1999 | Neher |
| 5,906,655 | A | 5/1999 | Fan |
| 5,907,555 | A | 5/1999 | Raith |
| 5,912,623 | A | 6/1999 | Pierson |
| 5,912,886 | A | 6/1999 | Takahashi |
| 5,912,921 | A | 6/1999 | Warren |
| 5,914,675 | A | 6/1999 | Tognazzini |
| 5,917,405 | A | 6/1999 | Joao |
| 5,918,180 | A | 6/1999 | Dimino |
| 5,918,183 | A | 6/1999 | Janky |
| 5,919,239 | A | 7/1999 | Fraker |
| 5,920,278 | A | 7/1999 | Tyler |
| 5,926,086 | A | 7/1999 | Escareno |
| 5,928,306 | A | 7/1999 | France |
| 5,929,752 | A | 7/1999 | Janky |
| 5,929,753 | A | 7/1999 | Montague |
| 5,933,080 | A | 8/1999 | Nojima |
| 5,936,529 | A | 8/1999 | Reisman |
| 5,937,164 | A | 8/1999 | Mages |
| 5,940,004 | A | 8/1999 | Fulton |
| 5,940,439 | A | 8/1999 | Kleider |
| 5,945,906 | A | 8/1999 | Onuma |
| 5,945,944 | A | 8/1999 | Krasner |
| 5,948,043 | A | 9/1999 | Mathis |
| 5,949,350 | A | 9/1999 | Girard |
| 5,959,533 | A | 9/1999 | Layson |
| 5,963,130 | A | 10/1999 | Schlager |
| 5,966,079 | A | 10/1999 | Tanguay |
| 5,969,600 | A | 10/1999 | Tanguay |
| 5,969,673 | A | 10/1999 | Bickley |
| 5,982,281 | A | 11/1999 | Layson, Jr. |
| 5,982,813 | A | 11/1999 | Dutta |
| 5,983,115 | A | 11/1999 | Mizikovsky |
| 5,990,785 | A | 11/1999 | Suda |
| 5,990,793 | A | 11/1999 | Bieback |
| 5,991,637 | A | 11/1999 | Mack |
| 5,995,847 | A | 11/1999 | Gergen |
| 5,997,476 | A | 12/1999 | Brown |
| 5,999,124 | A | 12/1999 | Sheynblat |
| 6,009,363 | A | 12/1999 | Beckert |
| 6,011,510 | A | 1/2000 | Yee |
| 6,014,080 | A | 1/2000 | Layson, Jr. |
| 6,014,555 | A | 1/2000 | Tendler |
| 6,018,667 | A | 1/2000 | Ghosh |
| 6,025,774 | A | 2/2000 | Forbes |
| 6,025,779 | A | 2/2000 | Huang |
| 6,026,125 | A | 2/2000 | Larrick |
| 6,026,300 | A | 2/2000 | Hicks |
| 6,026,345 | A | 2/2000 | Shah |
| 6,028,551 | A | 2/2000 | Schoen et al. |
| 6,029,111 | A | 2/2000 | Croyle |
| 6,031,454 | A | 2/2000 | Lovejoy |
| 6,034,622 | A | 3/2000 | Levine |
| 6,035,201 | A | 3/2000 | Whitehead |
| 6,035,217 | A | 3/2000 | Kravitz |
| 6,044,257 | A | 3/2000 | Boling |
| 6,046,687 | A | 4/2000 | Janky |
| 6,047,196 | A | 4/2000 | Makela |
| 6,054,928 | A | 4/2000 | Lemelson |

| | | |
|---|---|---|
| 6,055,426 A | 4/2000 | Beasley |
| 6,060,982 A | 5/2000 | Holtrop |
| 6,061,018 A | 5/2000 | Sheynblat |
| 6,061,392 A | 5/2000 | Bremer |
| 6,061,561 A | 5/2000 | Alanara |
| 6,069,570 A | 5/2000 | Herring |
| 6,072,396 A | 6/2000 | Gaukel |
| 6,075,797 A | 6/2000 | Thomas |
| 6,075,821 A | 6/2000 | Kao |
| 6,084,510 A | 7/2000 | Lemelson |
| 6,084,906 A | 7/2000 | Kao |
| 6,084,917 A | 7/2000 | Kao |
| 6,088,387 A | 7/2000 | Gelblum |
| 6,088,586 A | 7/2000 | Haverty |
| 6,091,325 A | 7/2000 | Zur |
| 6,091,786 A | 7/2000 | Chen |
| 6,091,957 A | 7/2000 | Larkins |
| 6,094,140 A | 7/2000 | Parente |
| 6,097,337 A | 8/2000 | Bisio |
| 6,100,806 A | 8/2000 | Gaukel |
| 6,115,597 A | 9/2000 | Kroll |
| 6,130,620 A | 10/2000 | Pinnow |
| 6,160,481 A | 12/2000 | Taylor |
| 6,181,253 B1 | 1/2001 | Eschenbach |
| 6,198,394 B1 | 3/2001 | Jacobsen |
| 6,198,914 B1 | 3/2001 | Saegusa |
| 6,218,945 B1 | 4/2001 | Taylor, Jr. |
| 6,226,510 B1 | 5/2001 | Boling |
| 6,232,916 B1 | 5/2001 | Grillo |
| 6,236,319 B1 | 5/2001 | Pitzer |
| 6,239,700 B1 | 5/2001 | Hoffman |
| 6,262,666 B1 | 7/2001 | Lodichand |
| 6,285,867 B1 | 9/2001 | Boling |
| 6,313,733 B1 | 11/2001 | Kyte |
| 6,356,841 B1 | 3/2002 | Hamrick et al. |
| 6,362,778 B2 | 3/2002 | Neher |
| 6,405,213 B1 | 6/2002 | Layson et al. |
| 6,437,696 B1 | 8/2002 | Lemelson |
| 6,518,889 B2 | 2/2003 | Schlager et al. |
| 6,580,908 B1 | 6/2003 | Kroll |
| 6,636,732 B1 | 10/2003 | Boling |
| 6,639,516 B1 | 10/2003 | Copley |
| 6,639,519 B2 | 10/2003 | Drummond et al. |
| 6,646,617 B1 | 11/2003 | Gaukel |
| 6,671,351 B2 | 12/2003 | Menard et al. |
| 6,674,368 B2 | 1/2004 | Hawkins et al. |
| 6,675,006 B1 | 1/2004 | Diaz |
| 6,687,497 B1 | 2/2004 | Parvulescu |
| 6,703,936 B2 | 3/2004 | Hill et al. |
| 6,762,684 B1 | 7/2004 | Camhi |
| 6,765,991 B1 | 7/2004 | Hanuschak |
| 6,766,159 B2 | 7/2004 | Lindholm |
| 6,774,797 B2 | 8/2004 | Freathy |
| 6,782,208 B1 | 8/2004 | Lundholm |
| 6,847,892 B2 | 1/2005 | Zhou et al. |
| 6,859,650 B1 | 2/2005 | Ritter |
| 6,912,399 B2 | 6/2005 | Zirul |
| RE38,838 E | 10/2005 | Taylor, Jr. |
| 6,972,684 B2 | 12/2005 | Copley |
| 7,002,477 B1 | 2/2006 | Camhi |
| 7,026,929 B1 | 4/2006 | Wallace |
| 7,038,590 B2 | 5/2006 | Hoffman |
| 7,042,338 B1 | 5/2006 | Weber |
| 7,092,695 B1 | 8/2006 | Boling |
| 7,106,191 B1 | 9/2006 | Liberati |
| 7,251,471 B2 | 7/2007 | Boling |
| 7,289,031 B1 | 10/2007 | Hock |
| RE39,909 E | 11/2007 | Taylor |
| 7,545,318 B2 | 6/2009 | Derrick |
| 2002/0115436 A1 | 8/2002 | Howell |
| 2003/0027547 A1 | 2/2003 | Wade |
| 2003/0107487 A1 | 6/2003 | Korman et al. |
| 2003/0197612 A1 | 10/2003 | Tanaka |
| 2004/0192353 A1 | 9/2004 | Mason et al. |
| 2005/0068169 A1 | 3/2005 | Copley et al. |
| 2006/0047543 A1 | 3/2006 | Moses |
| 2007/0041427 A1 | 2/2007 | Small |
| 2007/0082677 A1 | 4/2007 | Hart |
| 2007/0258417 A1 | 11/2007 | Harvey |
| 2008/0012760 A1 | 1/2008 | Derrick |
| 2008/0018458 A1 | 1/2008 | Derrick |
| 2008/0018459 A1 | 1/2008 | Derrick |
| 2008/0096521 A1 | 4/2008 | Boling |
| 2008/0174422 A1 | 7/2008 | Freathy |
| 2009/0224909 A1 | 9/2009 | Derrick |

FOREIGN PATENT DOCUMENTS

| | | |
|---|---|---|
| DE | 19625581 | 12/1997 |
| EP | 0017448 | 10/1980 |
| EP | 0242099 A2 | 10/1987 |
| EP | 0489915 A1 | 6/1992 |
| EP | 496538 A2 | 7/1992 |
| EP | 745867 A1 | 12/1996 |
| EP | 0780993 | 6/1997 |
| EP | 0809117 | 11/1997 |
| EP | 0889631 | 1/1999 |
| EP | 0946037 | 9/1999 |
| EP | 1363258 | 11/2003 |
| GB | 2141006 | 12/1984 |
| JP | 2007200 A | 1/1990 |
| JP | 6020191 A | 1/1994 |
| JP | 6036185 A | 2/1994 |
| WO | 87-04851 | 8/1987 |
| WO | 87-06713 | 11/1987 |
| WO | 97-03511 | 1/1997 |
| WO | 00-77688 | 12/2000 |
| WO | WO 01/73466 | 10/2001 |

OTHER PUBLICATIONS

International Search Report and the Written Opinion issued for PCT/US2006/30432, dated Aug. 8, 2007, 7 pages.

International Search Report issued for PCT/US2007/072736, dated Jan. 28, 2008.

International Search Report and Written Opinion issued for PCT/US2007/072740; Dated: Apr. 11, 2008: 8 Pages.

U.S. Appl. No. 09/495,080, filed Jan. 31, 2000, Boling.

U.S. Appl. No. 10/202,769, filed Jul. 25, 2002, Boling.

National Center for Juvenile Justice. (1991). Desktop guide to good juvenile probation practice, Pittsburgh, PA: Author.

Davis, S. (1986). Evaluation of the First Year of Expanded House Arrest, Oct. 1, 1984-Sep. 30, 1985: Oklahoma Department of Corrections.

Jones, R K., Wiliszowski, C. H., & Lacey, J. H. (1996). Evaluation of Alternative Programs for Repeat DWI Offenders (Report prepared by Mid-America Research Institute No. DOT HS 808 493). Washington, D.C.: National Highway Traffic Safety Administration Office of Program Development and Evaluation.

Reconnecting Youth & Community: A Youth Development Approach. (1996). Washington, DC: Family and Youth Services Bureau, Administration on Children, Youth and Families, U.S. Department of Health and Human Services.

Torbet, P. M. (1997). Automated information systems in juvenile probation. In D. W. Thomas & P. M. Torbet (Eds.), Juvenile probation administrator's desktop guide (pp. 81-89). Pittsburgh, PA: National Center for Juvenile Justice.

Spaans, E. C., & Verwers, C. (1997), Electronic monitoring in the Netherlands: results of the experiment. The Hague, Netherlands: Ministry of Justice.

Church, A., & Dunstan, S. (1997). Home Detention: the Evaluation of the Home Detention Pilot Program 1995-1997. Wellington, New Zealand: Ministry of Justice.

Canada. Solicitor General Canada. Annual Report on the Use of Electronic Surveillance as Required Under Subsection 195(1) of the Criminal Code. Ottawa: Solicitor General Canada, 1991-1994. (Book).

Klein, Saffran J. (1993), Electronic Monitoring vs. Halfway Houses: A Study of Federal Offenders, Unpublished Ph.D., University of Maryland, College Park.

Gould, L. A., & Archambault, W. G. (1995). Evaluation of a Computer-Assisted Monitoring (CAMO) Project: Some Measurement Issues. American Journal of Criminal Justice, 19(2), 255-273.

Mainprize, S. (1996). Elective Affinities in the Engineering of Social Control: The Evolution of Electronic Monitoring. Electronic Journal of Sociology, 2(2), 26.

Albert et al., "GIS/GPS in Law Enforcement Master Bibliography", Nov. 2000.

B. Wise, "Catching Crooks with Computers", American City and Country, May 1995, pp. 54-62.

International Search Report and Written Opinion for PCT/US2007/72746 dated Jul. 2, 2008.

International Search Report and Written Opinion for PCT/US2007/72743 dated Jan. 28, 2008.

Office Action dated Jun. 9, 2008 cited in U.S. Appl. No. 11/486,992.
Office Action dated Jan. 22, 2009 cited in U.S. Appl. No. 11/486,992.
Office Action dated Feb. 4, 2008 cited in U.S. Appl. No. 11/486,989.
Office Action dated Jul. 29, 2008 cited in U.S. Appl. No. 11/486,989.
Office Action dated Jan. 26, 2009 cited in U.S. Appl. No. 11/486,989.
Office Action dated May 22, 2008 cited in U.S. Appl. No. 11/486,976.
Office Action dated Oct. 2, 2008 cited in U.S. Appl. No. 11/486,976.
Office Action dated Jan. 28, 2009 cited in U.S. Appl. No. 11/486,976.
Office Action dated Jul. 20, 2009 cited in U.S. Appl. No. 11/486,976.
Office Action dated Dec. 12, 2007 cited in U.S. Appl. No. 11/486,991.
Office Action dated Jul. 7, 2008 cited in U.S. Appl. No. 11/486,991.
Notice of Allowance dated Feb. 27, 2009 cited in U.S. Appl. No. 11/486,991.
Office Action dated Dec. 11, 2008 cited in U.S. Appl. No. 11/830,398.
Office Action dated Aug. 19, 2009 cited in U.S. Appl. No. 11/830,398.
Notice of Allowance dated Sep. 18, 2009 cited in U.S. Appl. No. 11/486,992.

John H Murphy et al., "Advanced Electronic Monitoring for Tracking Persons on Probation or Parole: Final Report", Grumman STC, Feb. 1996.

D. Evans, "Electronic Monitoring: Testimony to Ontario's Standing Committee on Administration of Justice", Perspectives, Fall 1996, pp. 8-10.

M. Anderson (Editor), "GPS Used to Track Criminals", GIS World, Aug. 1996, p. 15.

B. Clede, "Radio Computers Locate Places, and Plot Them on a Map, Too", Law and Order, Oct. 1994, <http://www.clede.com/Articles/Police/gps.htm>.

G.W. Brown Jr., "What Impact Will Personal Position Location Technology Have Upon the Management and Administation of Mid-Sized Law Enforcement Organizations by the Year 2000?", California Commission of Peace Officer Standards and Training, Sacramento, California, Jul. 1994.

D. Anderson et al., "Seattle and Tacoma PDs Automated Crime Analysis", The Journal, National FOP Journal, Spring 1990.

M. Alexander et al., "An Automated System for the Identification and Prioritization of Rape Suspects", SDSS for Rape Suspect Identification, http://www.esri.com/library/userconf/proc97/proc97/to350/pap333.htm, Jul. 2001.

L. Pilant, "Spotlight on... High-Technology Solutions", From Police Chief, Document #54650, May 1996.

M. Lyew, "A New Weapon for Fighting Crime", American Probation and Parole Association, "Electronic Monitoring", 1996, <http://www.appa-net.org/about%20appa/electron.htm.

Hoshen, J.; Sennott, J.; Winkler, M. "Keeping tabs on criminals [electronic monitoring]" Spectrum, IEEE, vol. 32, Issue 2, Feb. 1995, pp. 26-32.

Nieto, M. (1996). Community correction Punishments: An Alternative to Incarceration for Nonviolent Offenders, Sacramento, California Research Bureau.

Whitfield, D. Tackling the Tag: The Electronic Monitoring of Offenders. Winchester, U.K.: Waterside Press, 1997. (Books).

Schwitzgebel, R. L., & Bird, R. M. (1970). Sociotechnical design factors in remote instrumentation with humans in natural environments. Behavior Research Methods and Instrumentation, 2(3),99-105.

Gable, R. K. (1986). Application of personal telemonitoring to current problems in corrections. Journal of Criminal Justice, 14 (2),167-176.

Charles, Michael T. "The Development of a Juvenile Electronic Monitoring Program." Federal Probation, vol. 53 (1989), 3-12.

Huskey, B. L. (1987). Electronic Monitoring: an Evolving Alternative, Perspectives, 11(3), 19-23.

U.S. Appl. No. 11/486,992, filed Dec. 29, 2009, Notice of Allowance.
U.S. Appl. No. 11/486,976, filed Dec. 21, 2009, Office Action.
U.S. Appl. No. 11/486,989, filed Feb. 23, 2010, Office Action.

REMOTE TRACKING AND COMMUNICATION DEVICE

CROSS-REFERENCE TO RELATED APPLICATIONS

This application is a continuation of U.S. patent application Ser. No. 11/202,427 filed Aug. 10, 2005, now issued as U.S. Pat. No. 7,330,122, and entitled "REMOTE TRACKING AND COMMUNICATION DEVICE," the disclosure of which is hereby incorporated herein by reference.

TECHNICAL FIELD

The field of the present invention is remote tracking and communication devices.

BACKGROUND OF THE INVENTION

Many different devices are known for the remote tracking individuals, cars, or the like and/or for remotely communicating with individuals. For example, standard cellular telephones allow two-way voice communication, but they are often incapable, or at least inefficient, at tracking the movement of the operating user. On the other hand, remote tracking devices are disclosed in U.S. Pat. Nos. 5,652,570, 5,731,757, 5,867,103, 6,072,396, and 6,100,806. Each of these mobile tracking devices enables the remote tracking of the unit (and the user operating or wearing the device), but they do not have two-way voice communication capabilities or have implementations of two-way voice communication capabilities which are at best awkward and require additional devices for implementation of full voice communication.

Moreover, the database systems which support such mobile tracking devices generally pass all location data obtained from the tracking devices directly through to the administrative user who requires analysis of the data. This places the task of sorting through the mountain of location data directly on the administrative user. Placing such a heavy burden on the administrative user, however, is generally undesirable and a waste of resources.

BRIEF SUMMARY OF THE INVENTION

The present invention is directed towards a remote tracking and communication device and a method of processing data generated by such a device. In a first separate aspect of the present invention, the remote tracking device comprises a housing which encloses a processor, a memory, a position locator, and first and second transmitters. Each of the latter components are electronically coupled to the processor. The first transmitter is adapted to send and receive wireless voice and data signals in a digital format. The second transmitter is also adapted to send and receive wireless voice and data signals in a digital format. The device further comprises a first battery, which is removably affixed to the housing, a speaker, a microphone, and a button for activation of voice communications with a call center using the first transmitter.

The remote tracking device may include a second battery, this one being enclosed within the housing, which is provided as a backup to the first battery. The charge on the second battery is maintained by the first battery. The remote tracking device may also include an optical transmitter and an optical receiver disposed within the housing. A strap, which includes an optical fiber and a conductor, may then have both ends affixed to the housing such that one end of the optical fiber is in alignment with the optical transmitter and the other end of the optical fiber is in alignment with the optical receiver. With this configuration, the processor may monitor optical continuity through the fiber using the optical transmitter and the optical receiver and may also monitor electrical continuity through the conductor.

In a second separate aspect of the invention, the method of processing data generated by a remote tracking device includes processing the data at the remote tracking device; initiating an alert notification at the remote tracking device when the data includes first predetermined characteristics; transmitting the data from the remote tracking device to a call center when the data includes second predetermined characteristics; directly providing notification to an administrator of the remote tracking device when the data includes third predetermined characteristics; and providing a report to the administrator which includes data generated during a predetermined time period having first or second predetermined characteristics. The third characteristics may be, and preferably are, defined by the administrator.

In a third separate aspect of the present invention, any of the foregoing aspects may be employed in combination.

Accordingly, it is an object of the present invention to provide an improved remote tracking and communication device and an improved method of processing data generated by a remote tracking and communication device. Other objects and advantages will appear hereinafter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which like reference numerals refer to similar components.

DETAILED DESCRIPTION OF THE INVENTION

Figure 1:
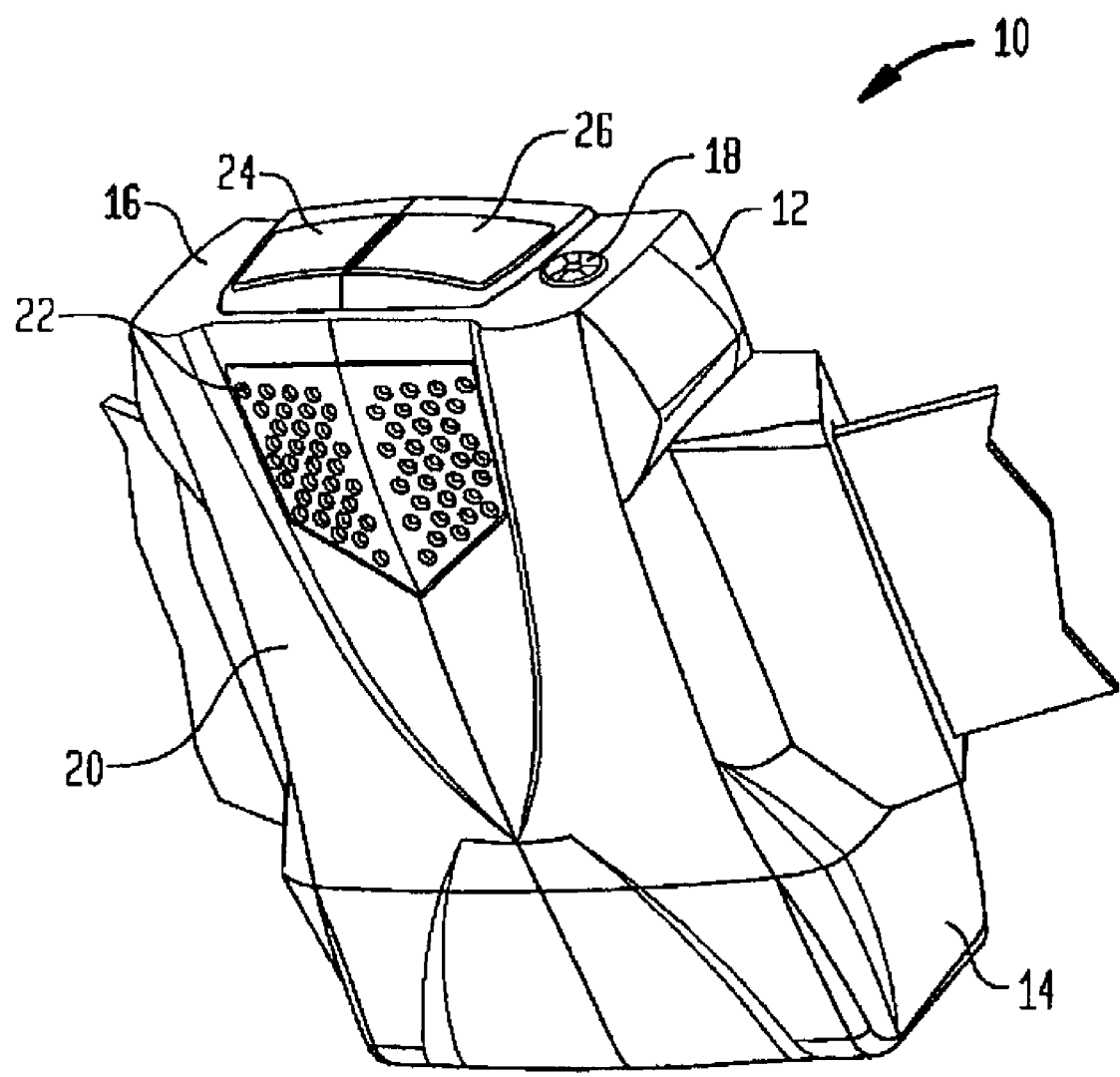
FIG. 1 is a front perspective view of a remote tracking and communication device.

Turning in detail to the drawings, FIG. 1 illustrates a remote tracking and communication device 10. The device 10 includes a housing 12 with a battery 14 removably affixed thereto. The single housing is configured to contain all electrical components necessary for tracking and communicating with the individual wearing the device 10. The battery 14 provides power to the electronic circuitry within the housing 12, as described below, and is preferably rechargeable. The top side 16 of the housing 12 includes a first set of through ports 18. Another side 20 of the housing 12 includes a second set of through ports 22. The first set of through ports 18 are configured to allow sound to pass through to a microphone (not shown) disposed within the housing 12, while the second set of through ports 22 are configured to allow sound to pass outward from a speaker (not shown) which is also disposed within the housing 12. The top side 16 of the housing 12 also includes two panels 24, 26, at least one of which is configured as a rocker button to activate one or more of the electronic components described below.

Figure 2:
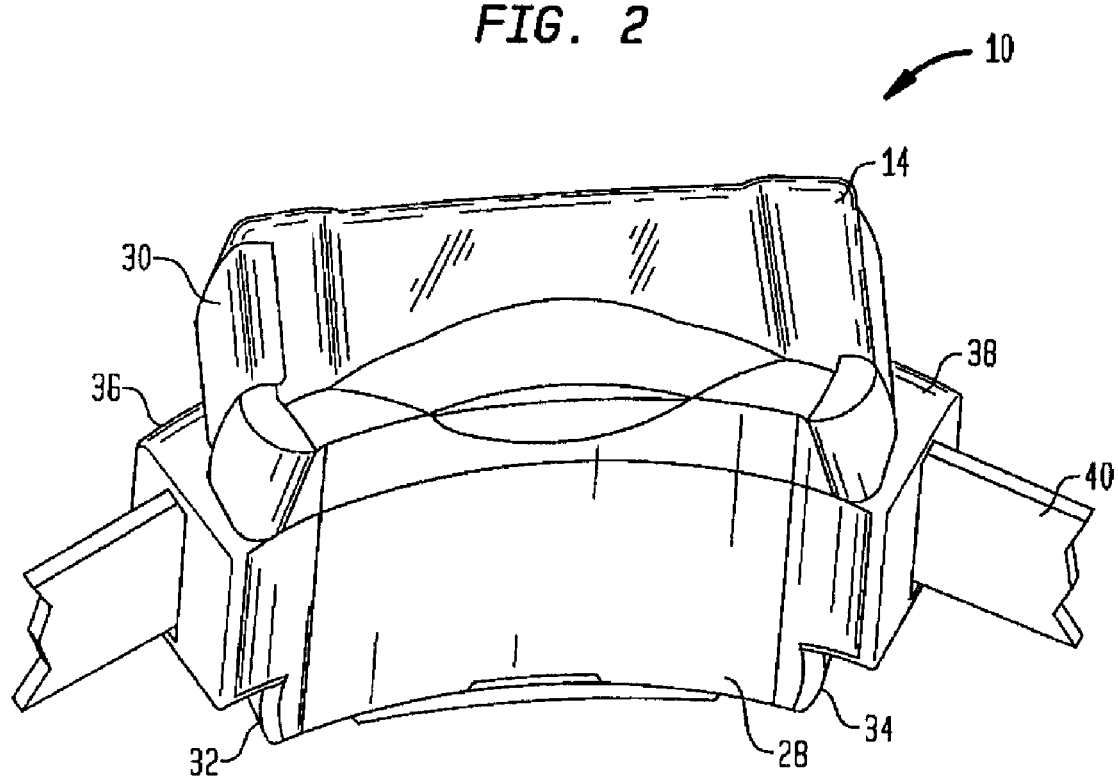
FIG. 2 is a rear perspective view of a remote tracking and communication device.

The back side 28 of the device 10 are shown in perspective in FIG. 2. The back side 28 includes an appropriate curvature so that the device 10 can be attached to a person's body, preferably to an ankle. The battery 14, which forms the bottom side of the device 10, includes a lever 30 which is movable to release the battery 14 from the housing 12. Each side 32, 34 of the housing includes a wing extension 36, 38, respectively. Each end of a strap 40 (partially shown) is secured within one of the wing extensions 36, 38.

Figure 3:
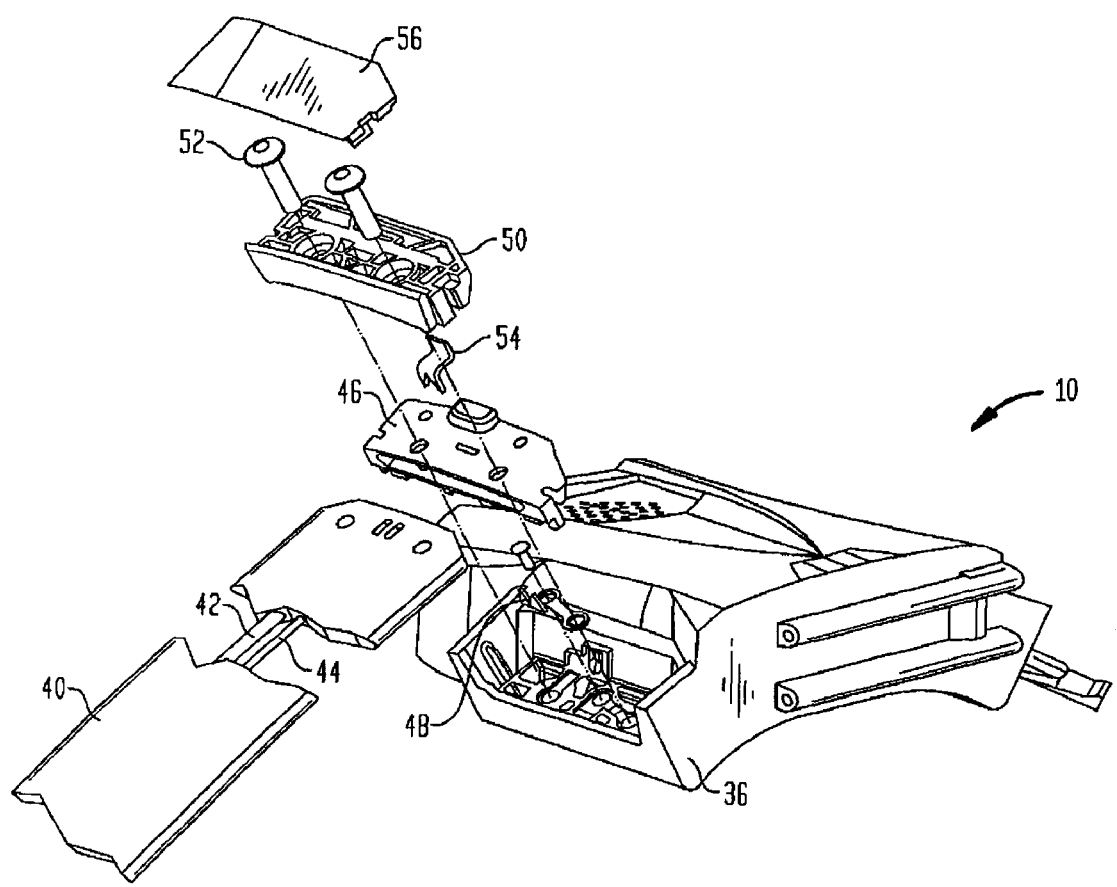
FIG. 3 is a partial exploded perspective view of a remote tracking and communication device.

FIG. 3 illustrates the manner of securing an end of the strap 40 to the wing extension 36. The strap 40 includes an optical fiber 42 and a conductive material 44 embedded throughout its length, each of which is exposed at either end of the strap 40. Each end of the strap 40 is inserted into a strap seal 46. The strap seal 46 seals the wing extension 36 against water and other external undesirable contaminants when the device 10 is fully assembled and the strap seal is compressed by the pressure block 50. The strap seal 46, with the end of the strap 40 inserted therein, is seated into the open wing extension 36 area as shown. When seated in this manner, each end is aligned with one of a light emitter/receiver (see FIG. 5), and the conductive material 44 is seated into a contact fork 48. The pressure block 50 is placed over the seated strap seal 46 and is held in place by tamper-resistant screws 52. Depending upon the application for which the device 10 is used, the screws 52 may be replaced by other appropriate fasteners. The pressure block 50 pushes a fork 54 into the optical fiber 42 to hold the optical fiber 42 in place against the light emitter/receiver. Lastly, a cover 56 is placed over the assembled wing extension 36.

Figure 4A:
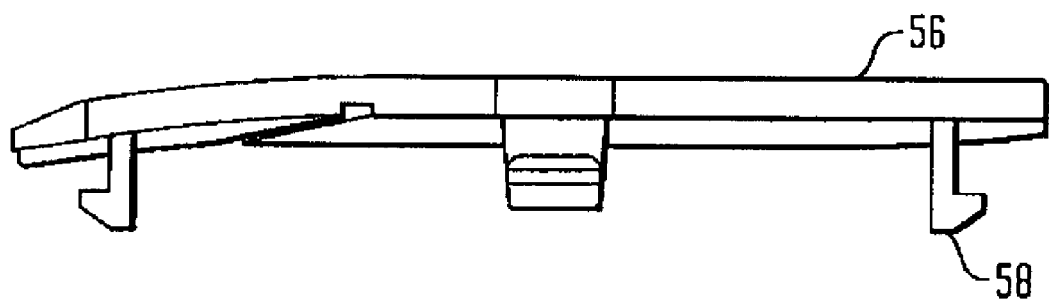
FIG. 4A is a perspective view of an extension cover portion of a remote tracking and communication device.
Figure 4B:
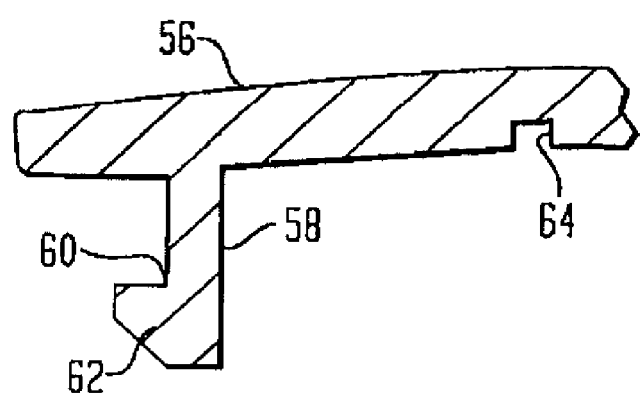
FIG. 4B is a partial sectional view of an extension cover portion of a remote tracking and communication device.

The cover 56 includes designed imperfections is configured to provide visual evidence of tampering, through breaking, visible deformity, or discoloration, and helps maintain an overall uniformity of look for the device 10. FIG. 4A illustrates the cover 56, which includes locking tabs 58 to prevent removal of the cover 56 once installed in place. Referring to FIG. 4B, each tab 58 includes a cut-out portion 60 near the end flange 62. Once the cover 56 is initially affixed to the housing 12 of the device 10, removal of the cover 56 will generally cause the end of the tabs 58 to break at the cut-out portion 60. The cover 56 also includes grooves 64 on the inside portion thereof as structural weak points. These grooves 64 are designed to break or become visibly deformed upon any force to remove the cover 56 once it is installed in place. Both of these features provide visible evidence of attempted efforts to tamper with the cover 56 once it is securely attached to an individual.

Figure 5:
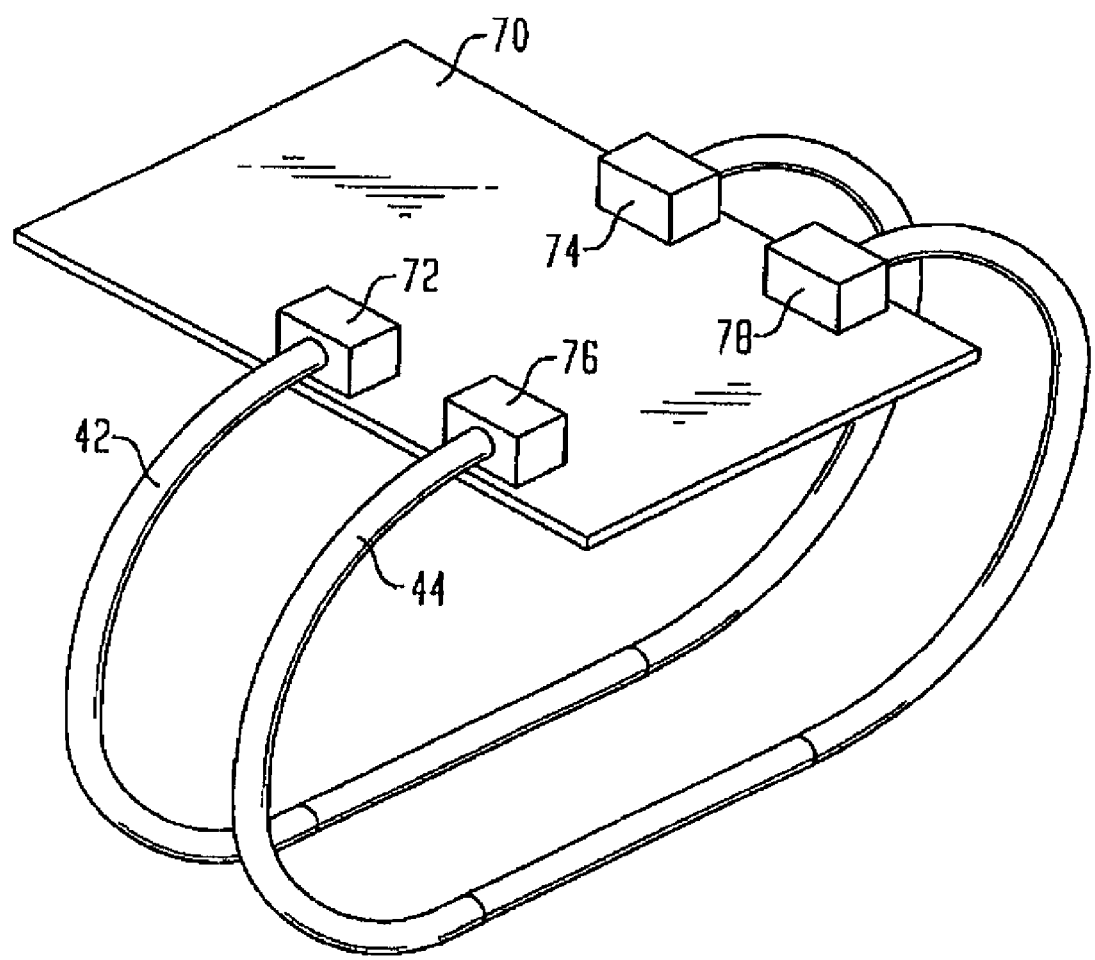
FIG. 5 is a schematic view of the tamper detection system for the strap of a remote tracking and communication device.

FIG. 5 illustrates the connection between the strap and the internal electronic components of the remote tracking and communication device. Internal to the device is a main PCB 70, to which the light emitter 72, the light receiver 74, an electrical signal emitter 76, and an electrical signal receiver 78 are affixed. Other electrical components within the housing are also affixed to the main PCB 70, or alternatively, may be affixed to one or more secondary PCBs that are electrically connected with the main PCB 70. As shown, the optical fiber 42 included in the strap (not shown) runs from the light emitter 72 to the light receiver 74 when the strap is secured to the device. With such a configuration, a "light circuit" is created between the PCB 70 and the strap, and this "light circuit" can be monitored for optical continuity to ensure that the strap remains in place and has not been tampered with by the wearer. Likewise, the conductive material 44 in the strap runs from the electrical signal emitter 76 to the electrical signal receiver 78. This configuration creates a more common electrical circuit which can be monitored for electrical continuity to detect tampering.

Additional tamper detection may be achieved through monitoring all externally accessible fasteners, e.g., the screws affixing the pressure block to the housing, the external battery, and the like, for electrical continuity by using each fastener to complete, or as part of, an electrical circuit.

Figure 6:
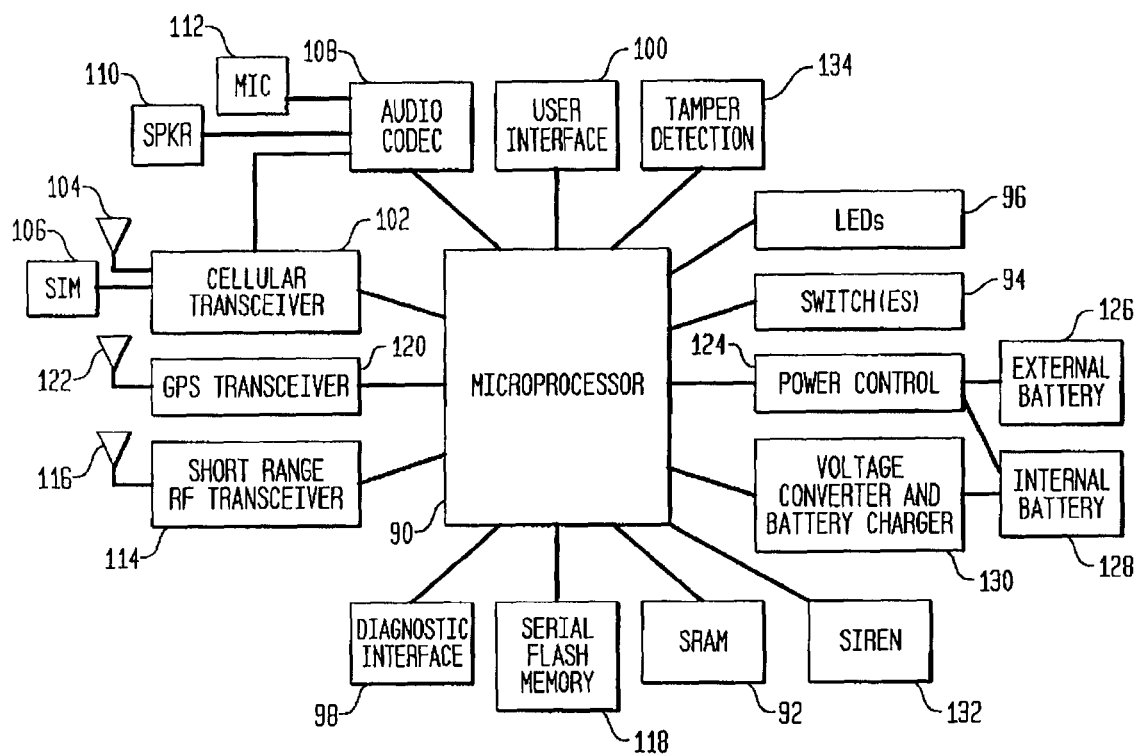
FIG. 6 is a schematic view of the electrical components in a remote tracking and communication device.

Turning to FIG. 6, the electronic components of the remote tracking and communication device are communicably and electronically connected as illustrated. The type of connection between the various components is a matter of design choice, and may vary depending upon the specific component chosen to perform for a particular function. Further, where a specific component is indicated, those skilled in the art will appreciate that the indicated component may be substituted with other, functionally equivalent components that are readily available in the marketplace.

The microprocessor 90 controls overall operation of the device according to programming stored in the SRAM memory 92. One or more switches (or buttons) 94 are included for activation of pre-designated functionalities of the microprocessor 90 and other electronic components. Preferably, no more than two switches are included, with one of the two switches being dedicated for activation of voice communications with a call center. LEDs 96 are also included as function indicators. The programming stored in the SRAM 92 memory may be placed there at the time of manufacture, or it may be uploaded to the device using a wired connection via the included diagnostic interface 98 or the user interface 100, or wirelessly via the cellular transceiver 102 and the associated antenna 104. As shown, the cellular transceiver 102 is of the GSM/GPRS variety, and thus includes a SIM card 106.

The cellular transceiver 102 enables two-way voice and data communications between the remote device and a call center. Voice communications are further enabled by a direct connection between the cellular transceiver 102 and the audio codec 108, which encodes and decodes the digital audio signal portion of the wireless transmission, and the associated speaker 110 and microphone 112. Speaker 110 may also be used as a siren or a separate siren 132 may be employed. Tamper Detection circuitry 134, as described with reference to FIG. 5, is also connected to microprocessor 90. Data communications are preferably enabled using the cellular data channel and/or the cellular control channel, via short message service (SMS). This provides redundancy for cellular systems in which service for both types of data communication is supported. Also, for those cellular systems in which the voice channel cannot be used simultaneously with the data channel, or in which the data channel is simply unavailable, the control channel provides a data link between the call center and the device.

A short range wireless transceiver 114 and associated antenna 116 are included for short range wireless voice and data communications with peripheral devices. Preferably, this second wireless transceiver 114 utilizes the wireless communications standard published by the ZigBee Alliance, information about which may be found at www.zigbee.org. The second wireless transceiver 114, however, may be designed and implemented using alternative wireless communication standards. The microprocessor 90 is programmed to pass through voice communications received by the cellular transceiver 102 to a voice-capable peripheral when such a peripheral is employed in conjunction with the remote tracking and communication device and is activated. Likewise, voice communications received from the peripheral are passed through to the cellular transceiver 102 for retransmission. Data received from such a peripheral, if any, may be stored by the microprocessor 90 in the serial flash memory 118 until additional processing is required by the microprocessor 90 or until retransmission occurs.

A GPS receiver 120 and associated GPS antenna 122 are included for establishing the geographical location of the remote tracking and communication device (and its wearer/user). Data from the GPS receiver 120 is received and passed through to the microprocessor 90, which in turn processes the data as required by the programming (described in more detail below) and stores it in the serial flash memory 118 pending transmission via the cellular transceiver 102. The cellular transceiver 102 may also be used to geographically locate the device through well known methods of cell tower triangulation. Geographical location using the cellular transceiver 102 may be performed in addition to or as a substitute for the GPS receiver 120. Other known ground-based methods for geographically locating the device may also be employed.

Power to the processor 90 and other electronic components is provided though a power controller 124 by an external battery 126, and if necessary, an internal battery 128. The external battery 126 is external to the housing (see FIG. 1) in which the other electronic components are enclosed. This battery is removable and is preferably rechargeable by a separate recharger unit. The internal battery 128 is internal to the housing. Power levels on the internal battery 128 are maintained and recharged using power from the external battery 126 and a battery recharger 130, which is also internal to the device. In this configuration, the internal battery 128 provides power backup during times when the external battery 126 is disconnected or depleted. Preferably, every remote tracking and communication device is associated with one or more spare external batteries so that the internal battery need only power the device during the short times, e.g., no more than one or two hours, the external batteries are exchanged. This eliminates the need to have an internal battery with a large power storage capacity.

Figure 7:
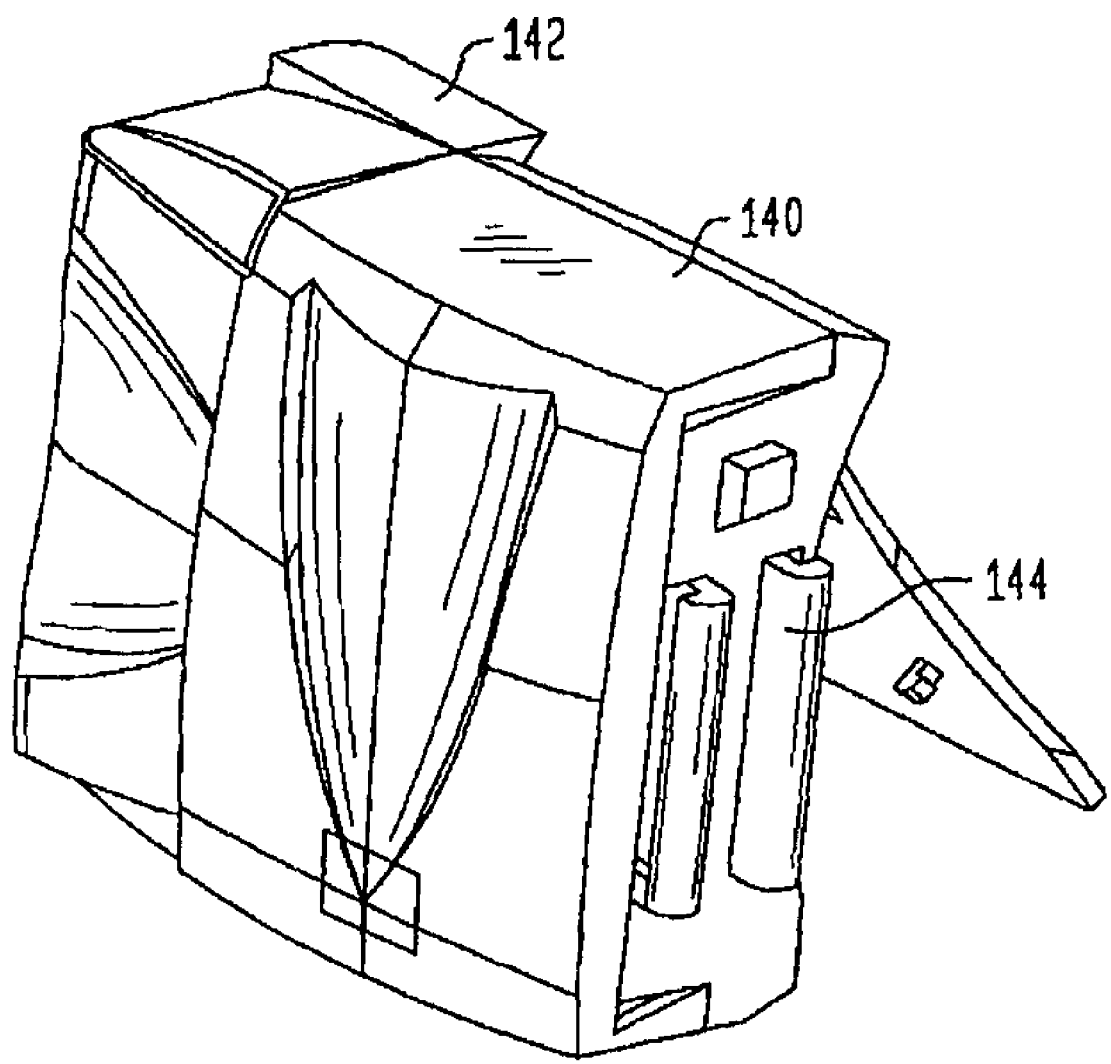
FIG. 7 is a front perspective view of a battery charger associated with a remote tracking and communication device.

The external battery recharging unit 140 is illustrated in FIG. 7. This battery recharging unit 140 is configured so that two external batteries may be simultaneously charged. As shown, one external battery 142 is coupled to one side of the recharging unit 140. Coupling flanges 144 are included on the sides of the recharging unit 140 so that the batteries may be attached and recharged.

Figure 8:
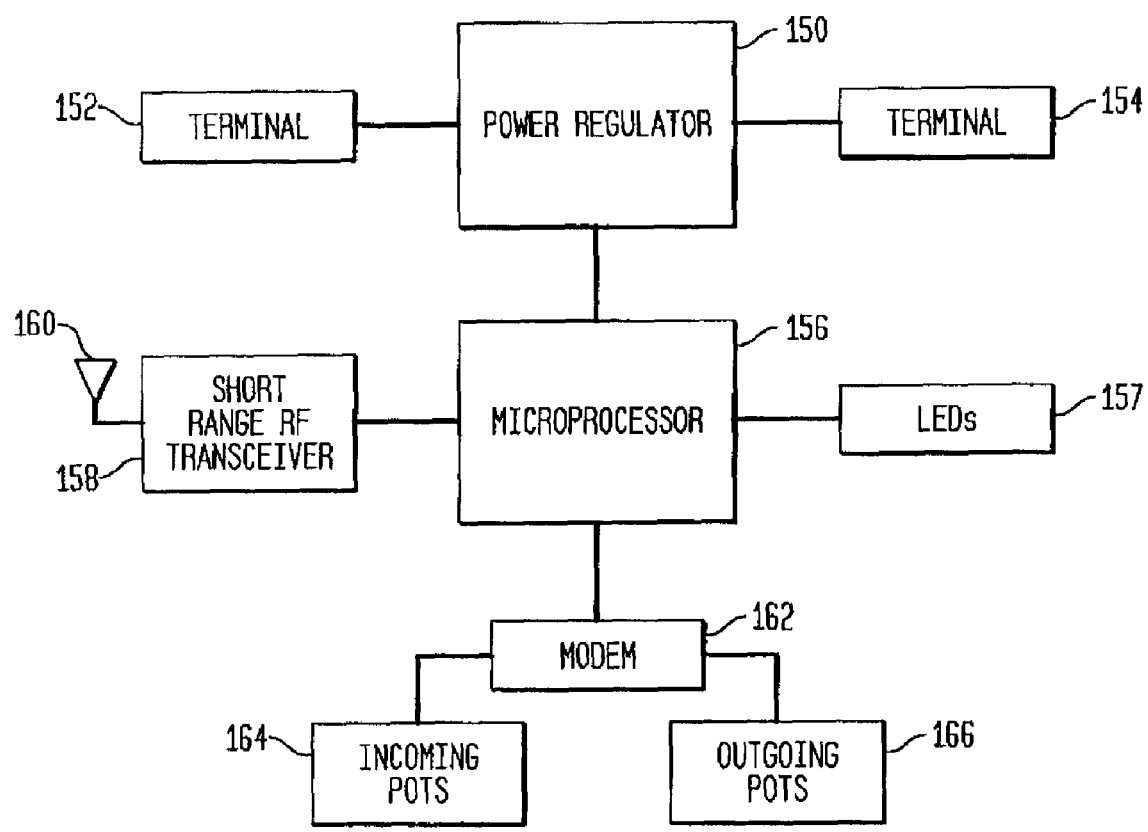
FIG. 8 is a schematic view of the electrical components in a battery charger associated with a remote tracking and communication device.

The circuitry within the external battery recharging unit is illustrated in FIG. 8. The power regulator 150 powers each of two battery recharging terminals 152, 154. LEDs 156 are provided to indicate the charging status of the batteries. A microprocessor 156 is also powered by the power regulator 150. A short range wireless transceiver 158 and associated antenna 160 communicate with the microprocessor 156. The short range wireless transceiver is configured to use the same wireless communications standard as the remote tracking and communication device to enable wireless voice and data communications between the device and the battery recharging unit. Voice and/or data communications received by the short range wireless transceiver 158 are passed through to the modem 162 for retransmission over an incoming POTS line terminal 164. For convenience, the modem passes through the incoming POTS line to an outgoing POTS line terminal 166 so that a telephone may remain connected to the POTS line. When the battery recharging unit and the associated remote tracking and communication device are used in a location where no cellular service exists, the device may be programmed to utilize its own internal short range wireless transceiver to establish voice and/or data communications with the call center through the POTS line connected to the battery recharging unit.

Figure 9:
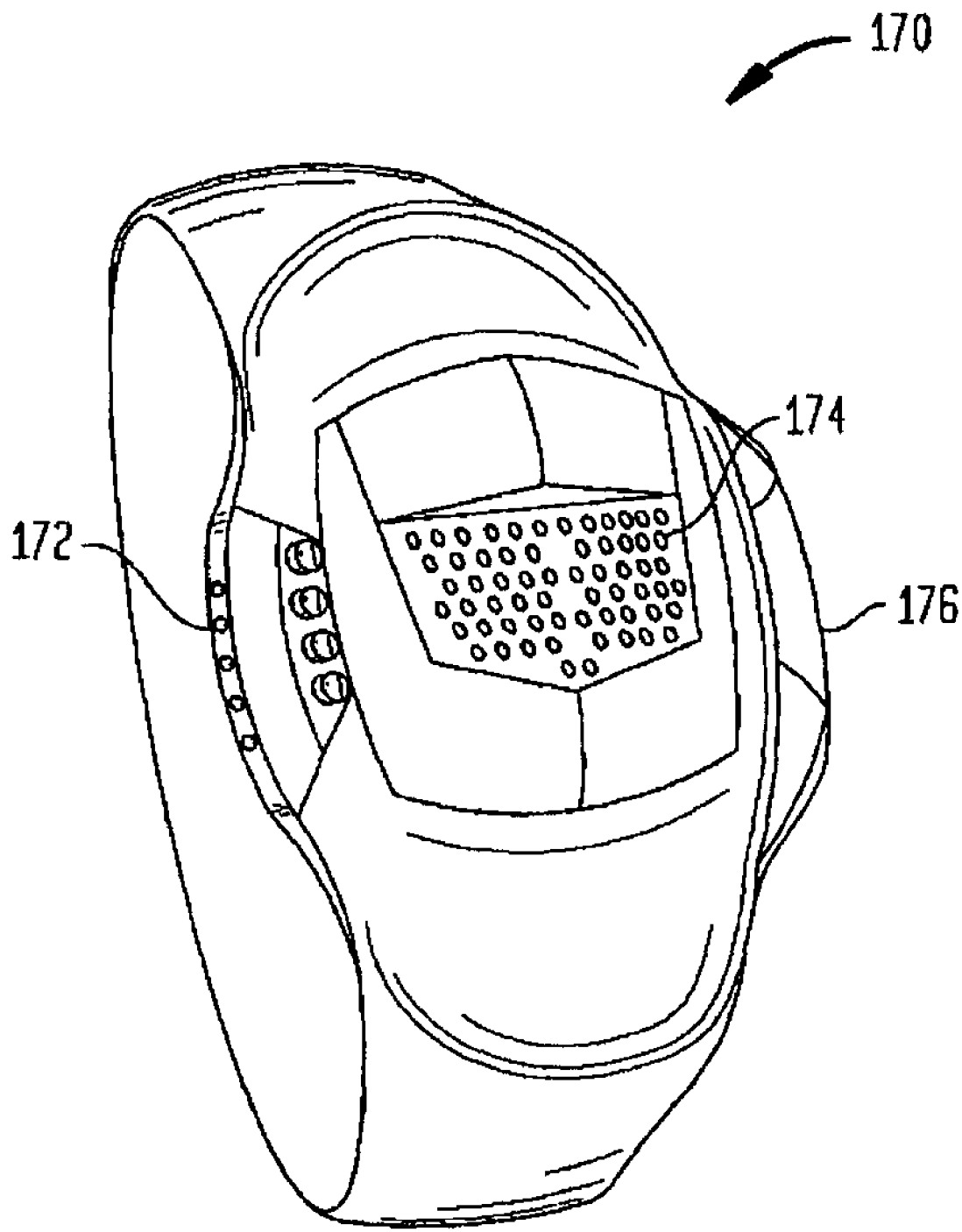
FIG. 9 is a perspective view of a peripheral associated with a remote tracking and communication device.

FIG. 9 illustrates a peripheral 170 which may be used in conjunction with the remote tracking and communication device. This peripheral 170 has the form factor of a watch and includes an internal speaker, an internal microphone, and an internal short range wireless transceiver, each component in electronic communication with the other components. The microphone and speaker are positioned opposite through ports 172, 174, respectively, in the housing of the peripheral to better enable voice communications using the peripheral 170. The short range wireless transceiver is configured to use the same wireless communications standard as the remote tracking and communication device to enable wireless voice and data communications between the device and the peripheral 170. A button 176 is included which, when pressed, causes a command signal to be sent to the remote tracking and communication device. This command signal instructs the remote tracking and communication device to initiate two-way voice communications with the call center. When the peripheral 170 is used for such voice communications, the peripheral 170 communicates wirelessly with the device using the respective short range wireless transceiver of each respective unit, and the device uses the included cellular transceiver to connect the voice communications with the call center.

Using the electronics configuration described above, the remote tracking and communication device may be programmed with a variety of useful features. One such feature is the ability to track the geographical location of the individual wearing the device. Most frequently, the GPS receiver is used to determine the location of the device (and thus the wearer) at the time indicated in the GPS signals received from GPS network satellites. When the GPS is unable to determine location, the cellular transceiver may be used to determine the location of the device using well-known cellular tower triangulation techniques. Once identified, the location of the device is passed to the microprocessor, which processes the data according to its programming and stores the data in the flash memory. The stored data is periodically transmitted to a central server.

Where the device is used to track the location and movement of an individual the microprocessor is programmed to compare location data against rules which establish curfews, inclusion zones, exclusion zones. A curfew is defined by a geographical area within which the device (and thus the wearer) needs to be physically located during specified times. Examples of curfew rules include requiring the wearer to be at a home area during the evening and overnight hours or at a work area during work hours. An inclusion zone is a geographical area within which the wearer is required to remain at all times. An exclusion zone is a geographical area outside of which the wearer is required at all times. The rules are generally established for any particular device at the time of initialization, however, the rules may be changed, or even temporarily suspended, at any time through revisions to the programming stored within the device. Such revisions may be implemented through direct connections to the diagnostic or user interface components of the device, or through the wireless data connection provided by the cellular transceiver.

In another such feature, the SRAM memory is utilized to store prerecorded voice messages or other audio which provide feedback during operation of the device. Prerecorded voice messages, however, are preferred because they do not require a reference manual or other crib sheet for interpretation. Voice message feedback may be advantageously utilized during initial setup of the device in that it provides step-by-step instructions for the setup routine, including directing the administrative user to input information about the device and user into the database via the web application described below. Voice message feedback may be similarly utilized during the detachment process to ensure that the device is removed by an authorized individual. During the removal process, if the audible instructions are not followed, i.e., inputting requested information into the database, then the device is preferably programmed to generate an alarm, which is processed as described below.

Following the initial power-up sequence, the device may be programmed to establish a data connection with a central server to which the device provides device-specific identification data. This eliminates any need for the administrative user to connect the device to a local computer or terminal for the initialization process. The central server is programmed to maintain a data base of data sent by tracking and communication devices. Upon initial contact, the central server creates a database entry using the device-specific identification data.

The administrative user is provided access to data on the central server via a computer or terminal. In instances where the device is used as a tracking device for offenders, the administrative user may be the supervision officer or other authority figure. For other service applications, the administrative user and the wearer may be the same individual. Access to the database may be advantageously implemented as a web application, or it may be implemented as a stand alone application. The administrative user accesses the database entry for the specific device by entering an identification code for that device. The administrative user is then presented with the opportunity to create an association in the database between the administrative user's account and that specific device. Thereafter, when accessing the database, the administrative user is preferably presented with a list of associated devices and no longer needs to enter device identification data to retrieve device-specific data. Once the administrative user has established the association with the device, the pre-recorded voice messages provide instructions for additional data for entry into the database. This additional data may include detailed personal and medical information about the individual wearing the device and, in the case where the wearer is an offender, detailed information regarding the rules for curfews, inclusion zones, exclusion zones, or any other information which is time and/or location related and is useable to control the activities of the offender. The rules established for a particular device are stored in the database and downloaded to the device so that the device can actively monitor for rule violations. Methods of designating rules for purposes of tracking are well-known, see, e.g., U.S. Pat. Nos. 5,652,570, 5,731,757, 5,867,103, 6,072,396, and 6,100,806, and thus not discussed in detail herein.

In addition, prerecorded voice messages may also walk the administrative user through affixing the device to the wearer using the tamper resistant strap. As the strap is affixed, the device audibly confirms successful service operation, e.g. that optical continuity is established through the optical fiber in the strap and that electrical continuity is established through the conductive material in the strap.

Figure 10:
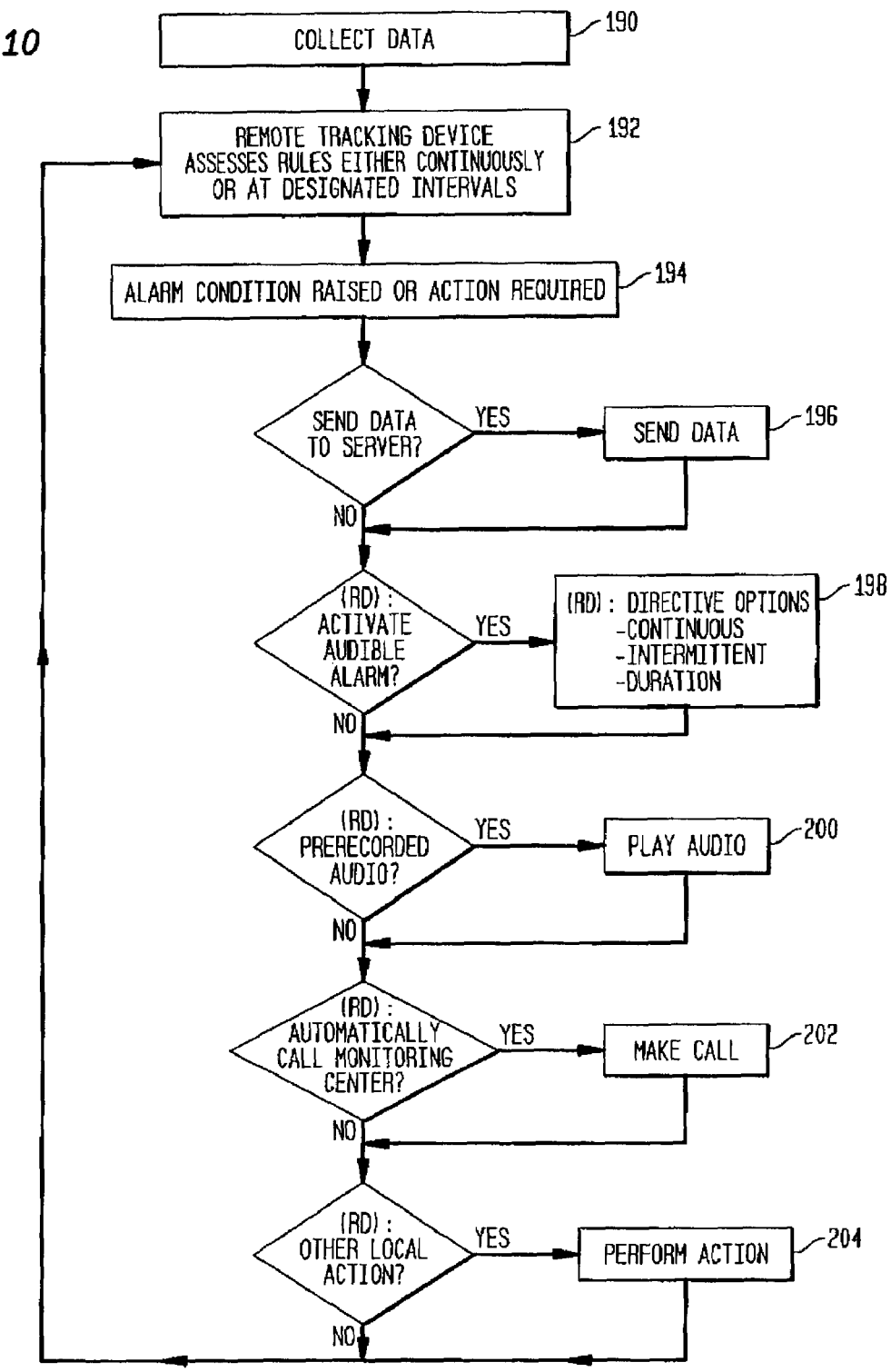
FIGS. 10 & 11 are flow charts which illustrate how data from a remote tracking and communication device is processed.

Once the initialization process is complete, the GPS receiver begins identifying the geographical location of the device, and the microprocessor processes and stores that location data according to its programming. The device may be programmed such that geographical location is continuously monitored or monitored at specified intervals. With an appropriate peripheral, the device may also be programmed to monitor physiological conditions of the wearer. In addition, the microprocessor actively monitors other components of the device for indications of tampering, battery exchanges/replacements, and equipment failure. FIG. 10 illustrates the process with which the microprocessor processes monitored conditions. The microprocessor is programmed to collect and store location data and data related to other monitored conditions in the flash memory step 190. The microprocessor is further programmed to perform additional functions based upon application of the rules to the data collected, upon occurrence of a particular condition (such as, e.g., when tampering is detected or when the wearer's heartbeat is irregular or no longer detectable, the latter requiring a separate peripheral), or at predetermined intervals step 192. When an alarm condition is raised or action is otherwise required step 194, whether because the action is preprogrammed or the action is the result of a command received from the central server, the call center, or the administrative user, the microprocessor proceeds through a series of steps to determine the reaction. It should be noted that the reaction of the microprocessor is preferably entirely programmable by the administrative user through the web application or through a direct interface connection to the device. Options for the reaction include immediately initiating a data connection with the central server to transmit data relating to an alarm or data that is stored in memory step 196, producing an audible alert using the pre-recorded audio stored in memory step 198, playing one of the pre-recorded messages step 200, initiating voice communications with the call center step 202, or take some other action step 204. Other actions may include, among other things, storing data related to an alarm in memory for transmission at a later time, storing updated rules data to memory, or suspending rule violations notification for a period of time.

In instances where the location data indicates the device is located outside of a geographical location permitted by the rules, the microprocessor preferably provides audio feed back, in the form of a siren or a prerecorded message, to the wearer of the rule violation and immediately sends notice of the rule violation to the central server for additional processing. Such a notice preferably includes the geographical location of the device, the time of the location, and an indicator of the rule violated.

Figure 11:
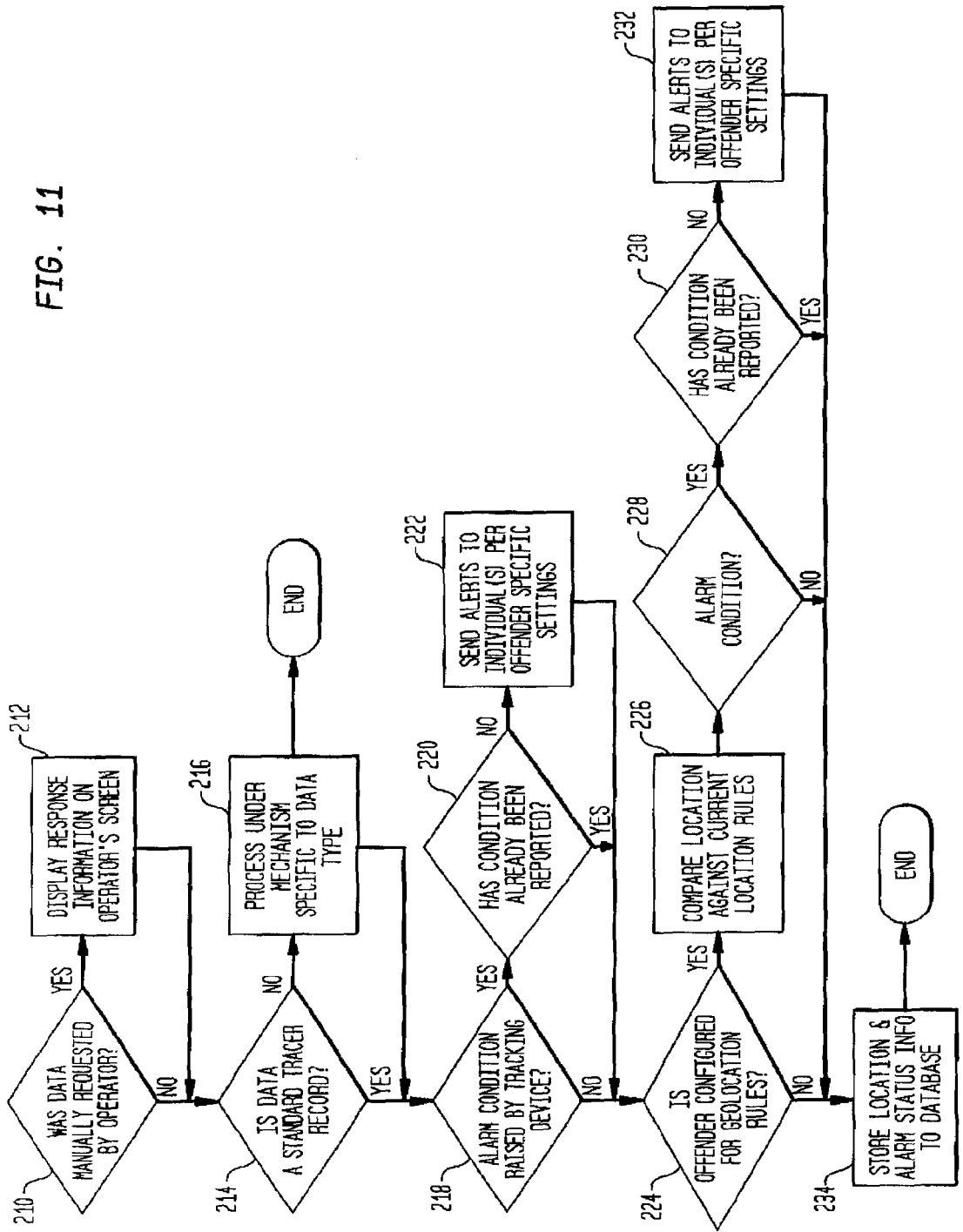

FIG. 11 illustrates the method of processing data from the device when it is received at the central server. Initially, the central server determines if the data includes information that was expressly requested by an operator at the call center or by the administrative user step 210, and if so, the data is relayed to the operator or administrative user for display at a computer or terminal step 212. Next, the central server determines if the data includes a standard tracer record step 214, which may include self-identification of the device, self-diagnostic reports, upload audit logs, component version identification, confirmation of parameter changes such as volume control, suspending audible alarms at the device, activating or deactivating the speaker, and the like. Standard tracer records are processed as necessary and noted in the database step 216. If the data does not include a tracer record, the central server determines if the data is an indicator of an alarm condition step 218. If the data is indicative of an alarm condition, the central server determines if the alarm is a repeat of an alarm which was previously received and reported step 220. For alarms that were not previously received, the central server takes the appropriate notification action as programmed by the administrative user step 222. If the data is not indicative of an alarm condition, the central server determines whether the individual wearing the device is subject to geographical location rules step 224. In such instances, the central server determines whether a rule has, in fact, been violated step 226 and determines if an alarm condition exists step 228. When an alarm condition is raised, the central server first if the alarm is a repeat of a previous alarm step 230, and if so, takes the appropriate notification action as programmed by the administrative user step 232. When immediate administrative user notification is not required, or no alarm condition is raised, the data is stored in the database step 234 and reported to the administrative user in periodic reports which at least lists all alarm conditions received since provision of the last report. All recorded data may optionally be included in the report.

The notification actions are fully configurable by the administrative user through the web application. The administrative user may designate specific types of alarms for immediate notification, and notification may be arranged through one or more methods including fax, email, text messaging to a pager, text messaging to a cellular phone, or through a direct call from the call center, or the like. In addition, the administrative user may also designate that some specific types of alarms result in direct notification to local authorities for immediate action.

The web application also provides the administrative user with the ability to temporarily suspend reactions to specific types of alarms. During suspension, the device will suspend localized reactions only (i.e., pre-recorded voice messages, siren, initiating voice communications with the call center). The device will still transmit all alarms identified during suspension to the central server, which will in turn include all identified alarms in the periodic reports (e.g., weekly) to the administrative user.

The web application also provides the administrative user and call center operators with the ability to enter and store notes. Notes may be in the form of personal daily monitoring logs, calendared appointments or action items, case management directives, or contextual notations related to particular alarms saved within the database.

Another feature of the central server is to enable the call center or the administrative user, through the web application, to send commands or other data to the device. Such commands may include playing a pre-recorded message to the wearer, instructing the microprocessor to transmit data to provide a current status of the location and status of the device, and the like. The administrative user may also use the web application to instruct to the call center to initiate voice communications with the wearer. The call center then contacts the wearer by placing a cellular call to the cellular transceiver. Once the wearer is contacted, the call center then initiates a call to the administrative user and conferences the two calls.

Preferably, all voice communications with the device are made through the call center so that all calls can be recorded and saved within the database. This enables the call center and the administrative user to access the recorded calls at a later time as needed. To ensure that all calls are recorded, the cellular transceiver blocks all incoming calls that do not originate from the call center. Alternatively, the cellular transceiver may selectively block incoming calls by utilizing the area code and telephone prefix to identify the origin of the call, allowing calls only from selected area codes and prefixes. Alternatively, the cellular transceiver may selectively block all calls-except those from list of phone numbers that is stored in memory.

The wearer may also initiate voice communications with the call center. At least one of the buttons on the exterior of the device housing is configured to activate voice communications using the cellular transceiver. When pressed, the device is programmed such that cellular transceiver only contacts the call center. The device preferably has stored in memory a primary number for the call center and a secondary number in case a connection cannot be achieved on the primary number. Further, the device is programmed to attempt make a predetermined number of attempts to contact the call center, first at the primary number, then at the secondary number. Should all attempts fail, the device is preferably programmed to sound an alert condition to the wearer as an indication that the device is out of a cellular service area or requires service for an internal fault.

Figure 12:
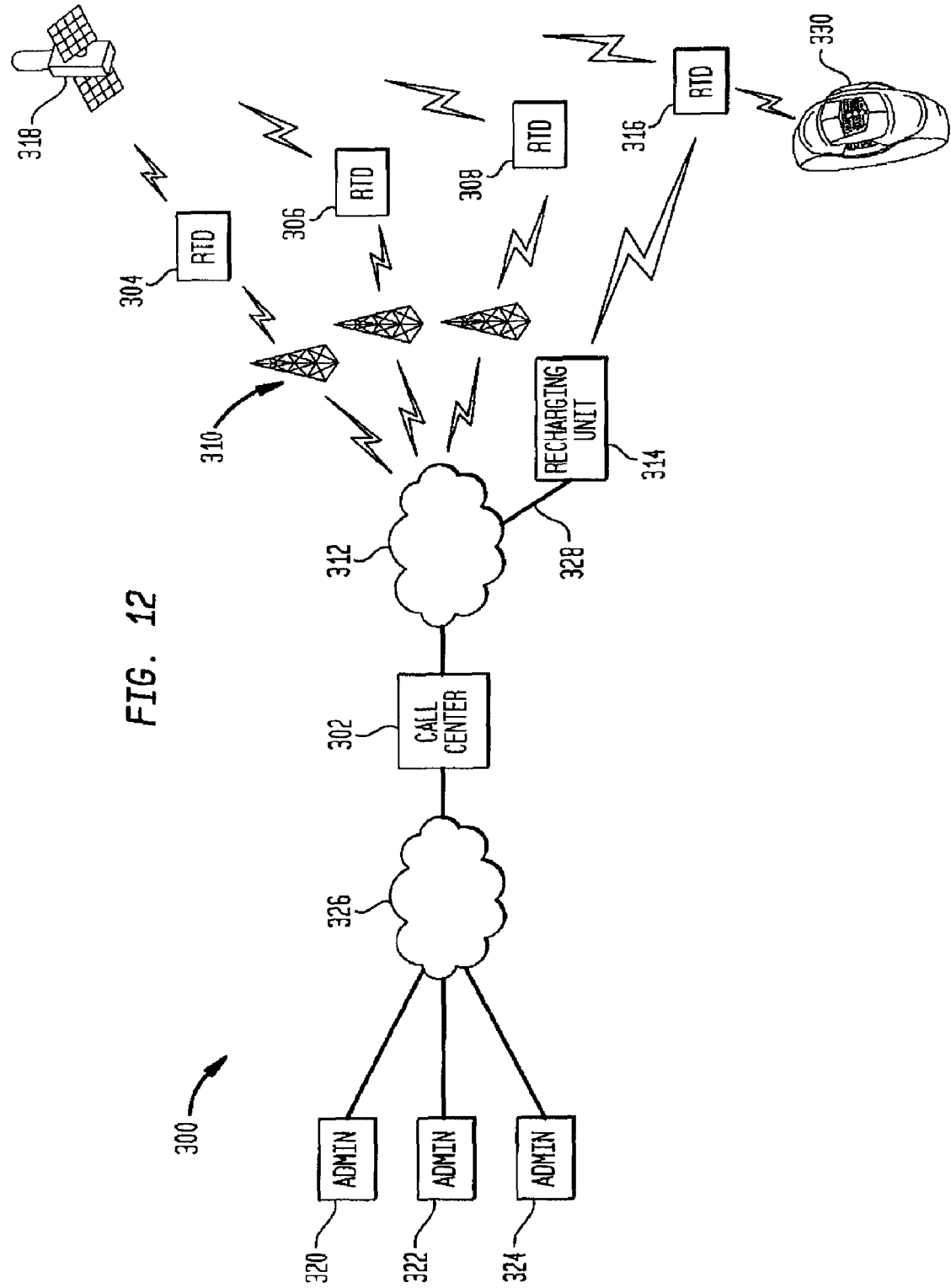
FIG. 12 is a block diagram of an embodiment of a system for tracking remote tracking and communication devices according to the concepts described herein.

FIG. 12 shows a system 300 for tracking remote tracking devices as described herein. Each remote tracking device (RTD) 304, 306, 308 and 316 communicate with a locationing network, such as GPS network 318 to determine their position. Additionally, RTDs 304, 306 and 308 communicate over a communications network, such as cellular network 310 and communications network 312 to send position status, and other data, to call center 302. Call center 302 may also send data to RTDs 304, 306 and 308 over the cellular network 310, 312, and voice communications may be established between the call center and any of the RTDs using the same. Call center 302 can also communicate with RTDs, as shown here by RTD 316, using a recharging unit, such as is described with reference to FIGS. 7 and 8. Recharging unit 314 communicates wirelessly with an RTD in range and then can use a plain old telephone (POTS) line 328 to communicate with call center 302. Peripheral 330, such as is described with reference to FIG. 9, can be used with any RTD. Call center 302 may communicate with the administrators, as is illustrated by administrators 320, 322 and 324, of the RTDs over communications network 326.

Thus, an improved remote tracking and communication device and an improved method of processing data generated by a remote tracking and communication device are disclosed. While embodiments of this invention have been shown and described, it will be apparent to those skilled in the art that many more modifications are possible without departing from the inventive concepts herein. The invention, therefore, is not to be restricted except in the spirit of the following claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perforin substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for enabling a call center to perform remote tracking of and communication with a user, the device comprising:
   a housing enclosing: a processor;
      a position locator electronically coupled to the processor;
      an optical transmitter electronically coupled to the processor;
      an optical receiver electronically coupled to the processor;
      a first transmitter electronically coupled to the processor, the first transmitter being adapted to send and receive wireless voice and data signals; and
      a speaker operable to play at least one of one or more audible messages or one or more audible tones from the processor and to enable voice communications using the first transmitter;
      a microphone operable with the speaker to enable voice communications using the first transmitter;
      a button in the housing, wherein the button is adapted to activate voice communications with the call center using the first transmitter; and
      a tamper resistant strap coupled to the tracking device and adapted to affix the tracking device securely to the user.

2. The device of claim 1, further comprising a primary battery removably connected to the device and providing power to the device, and a secondary battery enclosed in the housing providing power to the device when the primary battery is removed.

3. The device of claim 2, wherein the primary battery is adapted to maintain the charge on the secondary battery when the primary battery is connected to the device.

4. The device of claim 3, wherein the device notifies the user when the charge on the primary battery reaches a pre-determined level.

5. The device of claim 1, wherein the at least one of the one or more audible messages or one or more audible tones are stored in a memory and are associated with a pre-defined alert condition and designated for playback using the speaker upon occurrence of the associated alert condition.

6. The device of claim 5, wherein the at least one of the one or more audible messages or one or more audible tones includes a voice message.

7. The device of claim 5, wherein the device determines the occurrence of the pre-defined alert condition and in response, initiates the playback of the associated at least one of the one or more audible messages or one or more audible tones.

8. The device of claim 5, wherein the pre-defined alert condition is a battery reaching a predetermined power level.

9. The device of claim 1, wherein the device determines a violation of one or more pre-programmed rules and in response, initiates voice communications with the call center.

10. The device of claim 9, wherein the violation of the one or more pre-programmed rules is an indication that the strap has been tampered with.

11. The device of claim 1, wherein the position locator is a GPS receiver.

12. The device of claim 1, wherein the first transmitter is a cellular transceiver.

13. The device of claim 1, wherein the device provides the call center with a device-specific identifier and the call center creates entries in a database of data sent by the device specific to the device using the identifier.

14. The device of claim 13 wherein the call center maintains the database of the data entries and associates the entries of the device with an administrator of the device.

15. A device for enabling a call center to perform remote tracking of and communication with a user, the device comprising:
   a tamper-resistant housing;
   a tamper resistant strap connected to the housing and securely holding the device to the user;
   an internal battery providing power to the device, wherein the internal battery is within the tamper-resistant housing; and
   a detachable battery removably secured to the tamper-resistant housing wherein the detachable battery is external to the tamper-resistant housing and provides power to the tracking device and charges the internal battery upon being secured to the tamper-resistant housing;
   wherein the internal battery is adapted to provide power to the tracking device when the detachable battery is disconnected or depleted.

16. The device of claim 15, the housing further enclosing:
   a processor;
   an optical transmitter electronically coupled to the processor; and
   an optical receiver electronically coupled to the processor.

17. The device of claim 16 wherein the strap comprises an optical fiber extending from one end of the strap to the other end, the housing is adapted to receive both ends of the strap such that one end of the optical fiber is in alignment with the optical transmitter and the other end of the optical fiber is in alignment with the optical receiver.

18. The device of claim 17, wherein when both ends of the strap are affixed to the housing, the processor is adapted to monitor optical continuity through the fiber using the optical transmitter and the optical receiver.

19. The device of claim 17, wherein when both ends of the strap are affixed to the housing, the processor is adapted to monitor electrical continuity through a conductor.

20. The device of claim 15 further comprising a position locator including a GPS receiver.

21. The device of claim 15 further comprising a cellular transceiver being adapted to send and receive wireless voice and data signals.

22. The device of claim 21 further comprising a button, wherein the button is adapted to activate voice communications with the call center using the cellular transceiver.

23. A method comprising:
initiating an alert at a remote tracking device to notify a user of the device that a detachable battery has reached a predetermined power level; the detachable battery being externally and removably secured to a tamper-resistant housing of the tracking device wherein upon being secured to the tamper-resistant housing, the detachable battery is electrically coupled to the tracking device and an internal battery of the tracking device;
removing the detachable battery wherein upon removal of the detachable battery the internal battery provides power to the tracking device;
recharging of the detachable battery by an external power source; and
securing the charged detachable battery to the tamper-resistant housing wherein upon being secured to the housing the detachable battery recharges the internal battery.

24. The method of claim 23, further comprising:
processing data generated by the remote tracking device at the remote tracking device;
determining whether the data indicates that the tracking device is violating one or more pre-programmed rules; and
transmitting the processed data from the remote tracking device to a call center.

25. The method of claim 24, wherein the violation of one or more pre-programmed rules comprises the detachable battery having reached the predetermined power level.

26. The method of claim 24, wherein the violation of one or more pre-programmed rules comprises the internal battery having reached a second predetermined power level.

27. The method of claim 24, wherein the pre-programmed rules are defined by an administrator of the tracking device.

28. The method of claim 27 further comprising directly providing notification of the alert to the administrator.

29. The method of claim 28, wherein directly providing notification to an administrator of the remote tracking device includes the call center initiating voice communications with the administrator.

30. The method of claim 24, wherein initiating the alert at the remote tracking device includes the remote tracking device automatically initiating voice communications with the call center.

31. The method of claim 23, wherein initiating the alert at the remote tracking device includes activating a siren.

32. The method of claim 23, wherein initiating the alert at the remote tracking device includes playing a pre-recorded audio file.

33. The method of claim 32, wherein the pre-recorded audio file comprises a pre-recorded voice message.

34. A method comprising:
initiating an alert at a remote tracking device to notify a user that a detachable battery has reached a predetermined power level; the detachable battery being externally and removably secured to a tamper-resistant housing of the tracking device wherein upon being secured to the tamper-resistant housing of the tracking device, the detachable battery is electrically coupled to the tracking device and an internal battery of the tracking device;
removing the detachable battery wherein upon removal of the detachable battery the internal battery provides power to the tracking device;
reconnecting a charged detachable battery to the tamper-resistant housing wherein upon being secured to the housing the detachable battery recharges the internal battery; and broadcasting a warning signal if the internal battery has reached a second predetermined power level.

35. A device for enabling a call center to perform remote tracking of and communication with a user, the device comprising:
a housing enclosing:
a processor;
a position locator electronically coupled to the processor;
a first transmitter electronically coupled to the processor, the first transmitter being adapted to send and receive wireless voice and data signals; and
a speaker operable to play pre-recorded messages from the processor and to enable voice communications using the first transmitter;
a microphone operable with the speaker to enable voice communications using the first transmitter;
a button in the housing, wherein the button is adapted to activate voice communications with the call center using the first transmitter;
a tamper resistant strap coupled to the tracking device and adapted to affix the tracking device securely to the user;
a primary battery removably connected to the device and providing power to the device; and
a secondary battery enclosed in the housing providing power to the device when the primary battery is removed.

* * * * *